United States Patent
Vajapeyam et al.

(10) Patent No.: US 9,763,172 B2
(45) Date of Patent: Sep. 12, 2017

(54) IDLE-MODE ENHANCEMENTS FOR EXTENDED IDLE DISCONTINUOUS RECEPTION (EI-DRX)

(71) Applicant: QUALCOMM Incorporated, San Diego, CA (US)

(72) Inventors: Madhavan Srinivasan Vajapeyam, San Diego, CA (US); Miguel Griot, La Jolla, CA (US); Hao Xu, San Diego, CA (US); Wanshi Chen, San Diego, CA (US); Yongbin Wei, La Jolla, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 48 days.

(21) Appl. No.: 14/818,835

(22) Filed: Aug. 5, 2015

(65) Prior Publication Data
US 2016/0044578 A1    Feb. 11, 2016

Related U.S. Application Data

(60) Provisional application No. 62/034,123, filed on Aug. 6, 2014.

(51) Int. Cl.
| | |
|---|---|
| *H04W 48/12* | (2009.01) |
| *H04W 24/08* | (2009.01) |
| *H04W 52/02* | (2009.01) |
| *H04W 76/04* | (2009.01) |

(52) U.S. Cl.
CPC ........... *H04W 48/12* (2013.01); *H04W 24/08* (2013.01); *H04W 52/0216* (2013.01); *H04W 76/048* (2013.01); *Y02B 60/50* (2013.01)

(58) Field of Classification Search
CPC . H04W 48/12; H04W 24/08; H04W 52/0216; H04W 76/048
USPC ......................................................... 370/252
See application file for complete search history.

(56) References Cited

U.S. PATENT DOCUMENTS

| | | | |
|---|---|---|---|
| 2007/0291673 A1* | 12/2007 | Demirhan | ......... H04W 52/0216 370/311 |
| 2011/0280141 A1 | 11/2011 | Chin et al. | |
| 2013/0229965 A1 | 9/2013 | Bressanelli et al. | |
| 2015/0173039 A1 | 6/2015 | Rune et al. | |

FOREIGN PATENT DOCUMENTS

| | | | | |
|---|---|---|---|---|
| EP | 2621242 A1 | 7/2013 | | |
| SE | WO2013149666 | * 11/2013 | ............ | H04W 52/02 |

OTHER PUBLICATIONS

ISA/EPO, International Search Report and Written Opinion of the International Searching Authority, Int'l Appl. No. PCT/US2015/043918, Nov. 3, 2015, European Patent Office, Rijswijk, NL, 8 pgs.

* cited by examiner

*Primary Examiner* — Ronald B Abelson
(74) *Attorney, Agent, or Firm* — Holland & Hart LLP

(57) ABSTRACT

A user equipment (UE) may determine when to monitor for downlink (DL) communications such as paging messages based on both a received extended idle discontinuous reception (eI-DRX) cycle and a change in a downlink channel reliability condition of the UE. A base station may also adjust its transmission of paging information to a UE based on a eI-DRX cycle.

38 Claims, 19 Drawing Sheets

IDLE-MODE ENHANCEMENTS FOR EXTENDED IDLE DISCONTINUOUS RECEPTION (EI-DRX)

CROSS REFERENCES

The present application for patent claims priority to U.S. Provisional Patent Application No. 62/034,123 by Vajapeyam et al., entitled "Idle-Mode Enhancements for Extended Idle Discontinuous Reception (EI-DRX)," filed Aug. 6, 2014, assigned to the assignee hereof, and expressly incorporated by reference herein.

BACKGROUND

Field of the Disclosure

The present disclosure, for example, relates to wireless communication systems, and more particularly to extended idle discontinuous reception (eI-DRX) operations.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

A UE may also enter into various modes in order to save battery power. For example, a UE may enter into a discontinuous reception (DRX) mode in which communications received by the UE are limited. A DRX mode may be applied in either a connected state (C-DRX) or in an idle state (I-DRX). In each case, the UE limits its reception of communications to specified radio frames within a DRX cycle. A longer DRX cycle results in the UE communicating with a base station less frequently and potentially saving battery power. However, as a DRX cycle becomes longer, there is a risk that communication conditions for the UE may change during the time interval between the specified radio frames. For example, if an I-DRX cycle is long enough, it is possible that a UE could move between coverage areas of different base stations during the I-DRX cycle, meaning that the UE could awake and discover that the UE may have need of participating in a base station handoff operation before the UE can participate in other operations such as paging. In such situations, the UE risks missing a message such as a paging message due to the change in the UE's communication conditions.

SUMMARY

During extended idle discontinuous reception (eI-DRX) cycles, a user equipment (UE) may awake for paging and discover that the UE has a need to re-select a base station for UE/base station communications. In certain instances, the time taken by the UE to re-select a base station may result in the UE missing a paging occasion, and thus missing any paging messages delivered during the paging occasion. In response to this concern, a UE may determine when to monitor for downlink (DL) communications such as paging messages based on both a received eI-DRX cycle and a determined mobility of the UE. The determined mobility of the UE may reflect a change in UE location (and hence a potential change in base station connectivity) and may also reflect an anticipated degree of movement of the UE. Similarly, a base station may adjust its transmission of paging information to a UE based on a eI-DRX cycle and a mobility of the UE.

In some embodiments, a method for eI-DRX operation in a wireless communication system is disclosed. The method may include receiving, at a UE, a configuration for an eI-DRX cycle, identifying a change in a downlink channel reliability condition associated with the UE, and determining when to perform downlink (DL) channel monitoring based on the received eI-DRX cycle and the identified downlink channel reliability condition.

In one aspect, identifying the change in the downlink channel reliability condition may include determining the mobility of the UE with respect to a first base station coverage area. A UE mobility value may be determined that indicates a likelihood that the UE will move to a second base station coverage area during the received eI-DRX cycle. The method may also include requesting an adjusted eI-DRX cycle based on the determined UE mobility value.

In one aspect, identifying the change in the downlink channel reliability condition may include performing idle-mode measurements based on the eI-DRX cycle, the idle-mode measurements including measuring a signal strength of at least one of a first base station having a first base station coverage area and a second base station having a second base station coverage area, wherein the determining when to perform downlink channel monitoring is based on the idle-mode measurements. Performing idle-mode measurements may include performing the idle-mode measurements during a pre-wake-up time period before an eI-DRX-defined paging occasion (PO), where the pre-wake-up time period may be a function of the eI-DRX cycle. Additionally, the method may also include maintaining a connection with the first base station for a duration of the eI-DRX-defined PO when the signal strength of the first base station is less than the signal strength of the second base station and above a predefined minimum signal strength threshold, as well as establishing a connection with the second base station after the eI-DRX-defined PO. Alternatively, the method may include establishing a connection with the second base station before the eI-DRX-defined PO when the signal strength of the first base station is less than the signal strength of the second base station and less than a predefined minimum signal strength threshold, as well as participating in the eI-DRX-defined PO with the second base station. The method may also include receiving the pre-wake-up time period as part of a system information block (SIB).

In another aspect, the method may include establishing a short paging configuration to be used by the UE and a base station based at least in part on the change in the downlink channel reliability condition. Establishing the short paging configuration may include establishing a short paging cycle, the short paging cycle being shorter than the received eI-DRX cycle, as well as establishing a maximum number of monitoring instances for which the short paging cycle is to be used when there is a change in the downlink channel reliability condition. The method may further include performing downlink channel monitoring based on the short paging cycle and the maximum number of monitoring instances when the UE determines that there is a change in the downlink channel reliability condition.

In a second embodiment, an apparatus for extended idle discontinuous reception (eI-DRX) operation in a wireless communication system is disclosed. The apparatus may include means for receiving, at a user equipment (UE), a configuration for an eI-DRX cycle. The apparatus may also include means for identifying a change in a downlink channel reliability condition associated with the UE. Additionally, the apparatus may include means for determining when to perform downlink (DL) channel monitoring based on the received eI-DRX cycle and the identified downlink channel reliability condition.

In one aspect, the means for identifying the change in the downlink channel reliability condition may include means for determining the mobility of the UE with respect to a first base station coverage area. The means for determining a mobility of the UE may include means for determining a UE mobility value that indicates a likelihood that the UE will move to a second base station coverage area during the received eI-DRX cycle. The apparatus may additionally include means for requesting an adjusted eI-DRX cycle based on the determined UE mobility value.

In another aspect, the means for identifying the change in the downlink channel reliability condition may also include means for performing idle-mode measurements based on the eI-DRX cycle, the idle-mode measurements including measuring a signal strength of at least one of a first base station having a first base station coverage area and a second base station having a second base station coverage area, wherein the means for determining when to perform downlink channel monitoring is further based on the idle-mode measurements. The means for performing idle-mode measurements may include means for performing the idle-mode measurements during a pre-wake-up time period before an eI-DRX-defined PO, where the pre-wake-up time period may be a function of the eI-DRX cycle. The apparatus may further include means for maintaining a connection with the first base station for a duration of the eI-DRX-defined PO when the signal strength of the first base station is less than the signal strength of the second base station and above a predefined minimum signal strength threshold, as well as means for establishing a connection with the second base station after the eI-DRX-defined PO. Alternatively, the apparatus may include means for establishing a connection with the second base station before the eI-DRX-defined PO when the signal strength of the first base station is less than the signal strength of the second base station and less than a predefined minimum signal strength threshold, as well as means for participating in the eI-DRX-defined PO with the second base station. The apparatus may also include means for receiving the pre-wake-up time period as part of a system information block (SIB).

In yet another aspect, the apparatus may include means for establishing a short paging configuration to be used by the UE and a base station based at least in part on the change in the downlink channel reliability condition. The means for establishing a short paging configuration may include means for establishing a short paging cycle, the short paging cycle being shorter than the received eI-DRX cycle, and also means for establishing a maximum number of monitoring instances for which the short paging cycle is to be used when there is a change in the downlink channel reliability condition. The apparatus may further include means for performing downlink channel monitoring based on the short paging cycle and the maximum number of monitoring instances when the UE determines that there is a change in the downlink channel reliability condition.

In a third embodiment, an apparatus for extended idle discontinuous reception (eI-DRX) operation in a wireless communication system is disclosed. The apparatus includes a processor, memory in electronic communication with the processor, and instructions stored in the memory. The instructions are executable by the processor to receive, at a user equipment (UE), a configuration for an eI-DRX cycle, identify a change in a downlink channel reliability condition associated with the UE, and determine when to perform downlink (DL) channel monitoring based on the received eI-DRX cycle and the identified downlink channel reliability condition.

In one aspect, the instructions executable by the processor to identify the change in the downlink channel reliability condition may include instructions executable by the processor to determine a mobility of the UE with respect to a first base station coverage area. The instructions executable by the processor to determine the mobility of the UE may include instructions executable by the processor to determine a UE mobility value that indicates a likelihood that the UE will move to a second base station coverage area during the received eI-DRX cycle.

The apparatus may further include instructions executable by the processor to request an adjusted eI-DRX cycle based on the determined UE mobility value. The instructions executable by the processor to determine a mobility of the UE may include instructions executable by the processor to perform idle-mode measurements based on the eI-DRX cycle, the idle-mode measurements including measuring a signal strength of at least one of a first base station having a first base station coverage area and a second base station having a second base station coverage area, wherein determining when to perform downlink channel monitoring is based on the idle-mode measurements. The instructions executable by the processor to perform idle-mode measurements may also include instructions executable by the processor to perform the idle-mode measurements during a pre-wake-up time period before an eI-DRX-defined PO, where the pre-wake-up time period may be a function of the eI-DRX cycle.

The apparatus may further include instructions executable by the processor to maintain a connection with the first base station for a duration of the eI-DRX-defined PO when the signal strength of the first base station is less than the signal strength of the second base station and above a predefined minimum signal strength threshold, and establish a connection with the second base station after the eI-DRX-defined PO. The apparatus may further include instructions executable by the processor to establish a connection with the second base station before the eI-DRX-defined PO when the signal strength of the first base station is less than the signal strength of the second base station and less than a predefined minimum signal strength threshold, and participate in the eI-DRX-defined PO with the second base station. The apparatus may further include instructions executable by the processor to receive the pre-wake-up time period as part of an SIB.

The apparatus may further include instructions executable by the processor to establish a short paging configuration to be used by the UE and a base station based at least in part on the change in the downlink channel reliability condition. The instructions executable by the processor to establish the short paging configuration may include instructions executable by the processor to establish a short paging cycle, the short paging cycle being shorter than the received eI-DRX cycle, and establish a maximum number of monitoring instances for which the short paging cycle is to be used when there is a change in the downlink channel reliability condition. The apparatus may further include instructions executable by the processor to perform downlink channel monitoring based on the short paging cycle and the maximum number of monitoring instances when the UE determines that there is a change in the downlink channel reliability condition. The apparatus may further include instructions executable by the processor to perform downlink channel monitoring based on the short paging cycle and the maximum number of monitoring instances when the UE determines that there is a change in the downlink channel reliability condition.

In a fourth embodiment, a non-transitory computer-readable medium storing computer-executable code for eI-DRX operation in a wireless communication system is disclosed. The code is executable by a processor to receive, at a UE, a configuration for an eI-DRX cycle, identify a change in a downlink channel reliability condition associated with the UE, and determine when to perform downlink channel monitoring based on the received eI-DRX cycle and the determined mobility.

In one aspect, the code to identify the change in the downlink channel reliability condition may include code further executable by a processor to determine a mobility of the UE with respect to a first base station coverage area. The code to determine the mobility of the UE may include code to determine a UE mobility value that indicates a likelihood that the UE will move to a second base station coverage area during the received eI-DRX cycle.

In certain aspects, the code may be further executable by a processor to request an adjusted eI-DRX cycle based on the determined UE mobility value. The code to determine a mobility of the UE may include code further executable by a processor to perform idle-mode measurements based on the eI-DRX cycle, the idle-mode measurements including measuring a signal strength of at least one of a first base station having a first base station coverage area and a second base station having a second base station coverage area, wherein determining when to perform downlink channel monitoring is based on the idle-mode measurements. The code to perform idle-mode measurements may also include code further executable by a processor to perform the idle-mode measurements during a pre-wake-up time period before an eI-DRX-defined PO, where the pre-wake-up time period is a function of the eI-DRX cycle.

The code be further executable by a processor to maintain a connection with the first base station for a duration of the eI-DRX-defined PO when the signal strength of the first base station is less than the signal strength of the second base station and above a predefined minimum signal strength threshold, and establish a connection with the second base station after the eI-DRX-defined PO. The code be further executable by a processor to establish a connection with the second base station before the eI-DRX-defined PO when the signal strength of the first base station is less than the signal strength of the second base station and less than a predefined minimum signal strength threshold, and participate in the eI-DRX-defined PO with the second base station. The code be further executable by a processor to receive the pre-wake-up time period as part of an SIB.

The code may be further executable by the processor to establish a short paging configuration to be used by the UE and a base station based at least in part on the change in the downlink channel reliability condition. The code to establish the short paging configuration may include code further executable by the processor to establish a short paging cycle, the short paging cycle being shorter than the received eI-DRX cycle, and establish a maximum number of monitoring instances for which the short paging cycle is to be used when there is a change in the downlink channel reliability condition. The code may further include code further executable by the processor to perform downlink channel monitoring based on the short paging cycle and the maximum number of monitoring instances when the UE determines that there is a change in the downlink channel reliability condition. The code may be further executable by the processor to perform downlink channel monitoring based on the short paging cycle and the maximum number of monitoring instances when the UE determines that there is a change in the downlink channel reliability condition.

In yet another embodiment, a method for eI-DRX operation in a wireless communication system is disclosed. The method may include transmitting from a base station to a UE a configuration for an eI-DRX cycle. The method may also include adjusting when to transmit paging information to the UE based on the eI-DRX cycle. The method may additionally include transmitting paging information to the UE.

In one aspect, the adjusting when to transmit paging information may include receiving a request from the UE to shorten the eI-DRX cycle, and shortening the eI-DRX cycle in response to the received request. The method may also include establishing with the UE a pre-wake-up time period for the UE to perform idle-mode measurements before an eI-DRX-defined PO for the UE, the idle-mode measurements including measuring a signal strength of one or more base stations. Additionally, the method may include broadcasting the pre-wake-up time period as part of a SIB.

In another aspect, the method may include establishing a short paging configuration to be used by the UE and the base station based at least in part on the change in the downlink channel reliability condition. The establishing the short paging configuration may include establishing a short paging cycle, the short paging cycle being shorter than the received eI-DRX cycle, as well as establishing a maximum number of monitoring instances for which the short paging cycle is to be used. The method may further include re-transmitting paging information based on the short paging cycle and the maximum number of monitoring instances. Additionally, the method may include establishing synchronization of system frame number (SFN) cycles between one or more base stations within an mobility management entity (MME) tracking area. The method may also include re-transmitting paging information simultaneously with the one or more base stations within the MME tracking area. Additionally, the method may include receiving a stop-page message from a MME indicating that the UE has performed a system access and that the base station may stop re-transmitting paging information to the UE.

In still another embodiment, an apparatus for eI-DRX operation in a wireless communication system is disclosed. The apparatus may include means for transmitting from a base station to a user equipment (UE) a configuration for an eI-DRX cycle. The apparatus may also include means for adjusting when to transmit paging information to the UE based on the eI-DRX cycle. Additionally, the apparatus may include means for transmitting paging information to the UE.

In an aspect, the means for adjusting when to transmit paging information may include means for receiving a request from the UE to shorten the eI-DRX cycle, as well as means for shortening the eI-DRX cycle in response to the received request. The apparatus may also include means for establishing with the UE a pre-wake-up time period for the UE to perform idle-mode measurements before an eI-DRX-defined PO for the UE, the idle-mode measurements including measuring a signal strength of one or more base stations. The apparatus may further include means for broadcasting the pre-wake-up time period as part of an SIB.

In another aspect, the apparatus may include means for establishing a short paging configuration to be used by the UE and the base station. The means for establishing a short paging configuration may include means for establishing a short paging cycle, the short paging cycle being shorter than the received eI-DRX cycle, as well as means for establishing a maximum number of monitoring instances for which the short paging cycle is to be used. The apparatus may further include means for re-transmitting paging information based on the short paging cycle and the maximum number of monitoring instances. Additionally, means for establishing synchronization of SFN cycles between one or more base stations within the MME tracking area may also be included in the apparatus. The apparatus may also include means for re-transmitting paging information simultaneously with the one or more base stations within the MME tracking area. Additionally, the apparatus may include means for receiving a stop-page message from an MME indicating that the UE has performed a system access and that the base station may stop re-transmitting paging information to the UE.

In another embodiment, an apparatus for eI-DRX operation in a wireless communication system is disclosed. The apparatus may include a processor, memory in electronic communication with the processor, and instructions stored in the memory. The instructions are executable by the processor to transmit from a base station to a UE a configuration for an eI-DRX cycle, adjust when to transmit paging information to the UE based on the eI-DRX cycle, and transmit paging information to the UE.

In one aspect, the instructions executable by the processor to adjust when to transmit paging information may include instructions executable by the processor to receive a request from the UE to shorten the eI-DRX cycle, and shorten the eI-DRX cycle in response to the received request. The apparatus may further include instructions executable by the processor to establish with the UE a pre-wake-up time period for the UE to perform idle-mode measurements before an eI-DRX-defined PO for the UE, the idle-mode measurements including measuring a signal strength of one or more base stations. The apparatus may further include instructions executable by the processor to broadcast the pre-wake-up time period as part of an SIB.

Additionally, the apparatus may include instructions executable by the processor to establish a short paging configuration to be used by the UE and the base station. The instructions executable by the processor to establish a short paging configuration may include instructions executable by the processor to establish a short paging cycle, the short paging cycle being shorter than the received eI-DRX cycle, and establish a maximum number of monitoring instances for which the short paging cycle is to be used. The apparatus may further include instructions executable by the processor to re-transmit paging information based on the short paging cycle and the maximum number of monitoring instances. Additionally, the apparatus may also include instructions executable by the processor to establish synchronization of SFN cycles between one or more base stations within the MME tracking area. The apparatus may also include instructions executable by the processor to re-transmit paging information simultaneously with the one or more base stations within the MME tracking area. Additionally, the apparatus may include instructions executable by the processor to receive a stop-page message from an MME indicating that the UE has performed a system access and that the base station may stop re-transmitting paging information to the UE.

In still another embodiment, a non-transitory computer-readable medium storing computer-executable code for eI-DRX operation in a wireless communication system is disclosed. The code may be executable by a processor to transmit from a base station to a UE a configuration for an eI-DRX cycle, adjust when to transmit paging information to the UE based on the eI-DRX cycle, and transmit paging information to the UE.

In certain aspects, the code to adjust when to transmit paging information may include code executable by the processor to receive a request from the UE to shorten the eI-DRX cycle, and shorten the eI-DRX cycle in response to the received request. The non-transitory computer-readable medium may further include code executable by the processor to establish with the UE a pre-wake-up time period for the UE to perform idle-mode measurements before an eI-DRX-defined PO for the UE, the idle-mode measurements including measuring a signal strength of one or more base stations. The non-transitory computer-readable medium may further include code executable by the processor to broadcast the pre-wake-up time period as part of an SIB.

Additionally, the non-transitory computer-readable medium may further include code executable by the processor to establish a short paging configuration to be used by the UE and the base station. The code to establish a short paging configuration may include code executable by the processor to establish a short paging cycle, the short paging cycle being shorter than the received eI-DRX cycle, and establish a maximum number of monitoring instances for which the short paging cycle is to be used. The non-transitory computer-readable medium may further include code executable by the processor to re-transmit paging information based on the short paging cycle and the maximum number of monitoring instances. Additionally, the non-transitory computer-readable medium may further include code executable by the processor to establish synchronization of SFN cycles between one or more base stations within the MME tracking area. The non-transitory computer-readable medium may further include code executable by the processor to re-transmit paging information simultaneously with the one or more base stations within the MME tracking area. Additionally, the non-transitory computer-readable medium may further include code executable by the processor to receive a stop-page message from an MME indicating that the UE has performed a system access and that the base station may stop re-transmitting paging information to the UE.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

A typical idle discontinuous reception (I-DRX) cycle may last up to a few seconds. For example, in a long-term evolution (LTE) system, an I-DRX cycle may be configured to last as long as 2.56 seconds. However, an extended I-DRX (eI-DRX) cycle may last many times longer than a typical I-DRX cycle. Instead of lasting a period of seconds, an eI-DRX cycle could last several minutes (e.g., 10 minutes). A UE operating under a typical I-DRX cycle may awaken from an idle-mode and, because of the shortness of the I-DRX cycle, may likely re-connect with a same base station to which the UE was connected before it went into idle-mode. However, a UE operating under an eI-DRX cycle runs the risk of being moved between base station coverage areas while the UE is effectively asleep. This means that when the UE awakes and attempts to reconnect with a base station in order to monitor for downlink (DL) traffic such as paging messages, the UE may need to first re-connect with a base station that is different from the base station to which the UE had been connected prior to entering its power saving mode.

In response to this concern, a UE may determine when to monitor for DL communications such as paging messages. The UE may make its determination based on both a received eI-DRX cycle and a determined mobility of the UE. A UE that is more likely to move or that has moved may indicate a mobility that compels the UE to alter when and how it monitors for DL communications such as paging messages.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
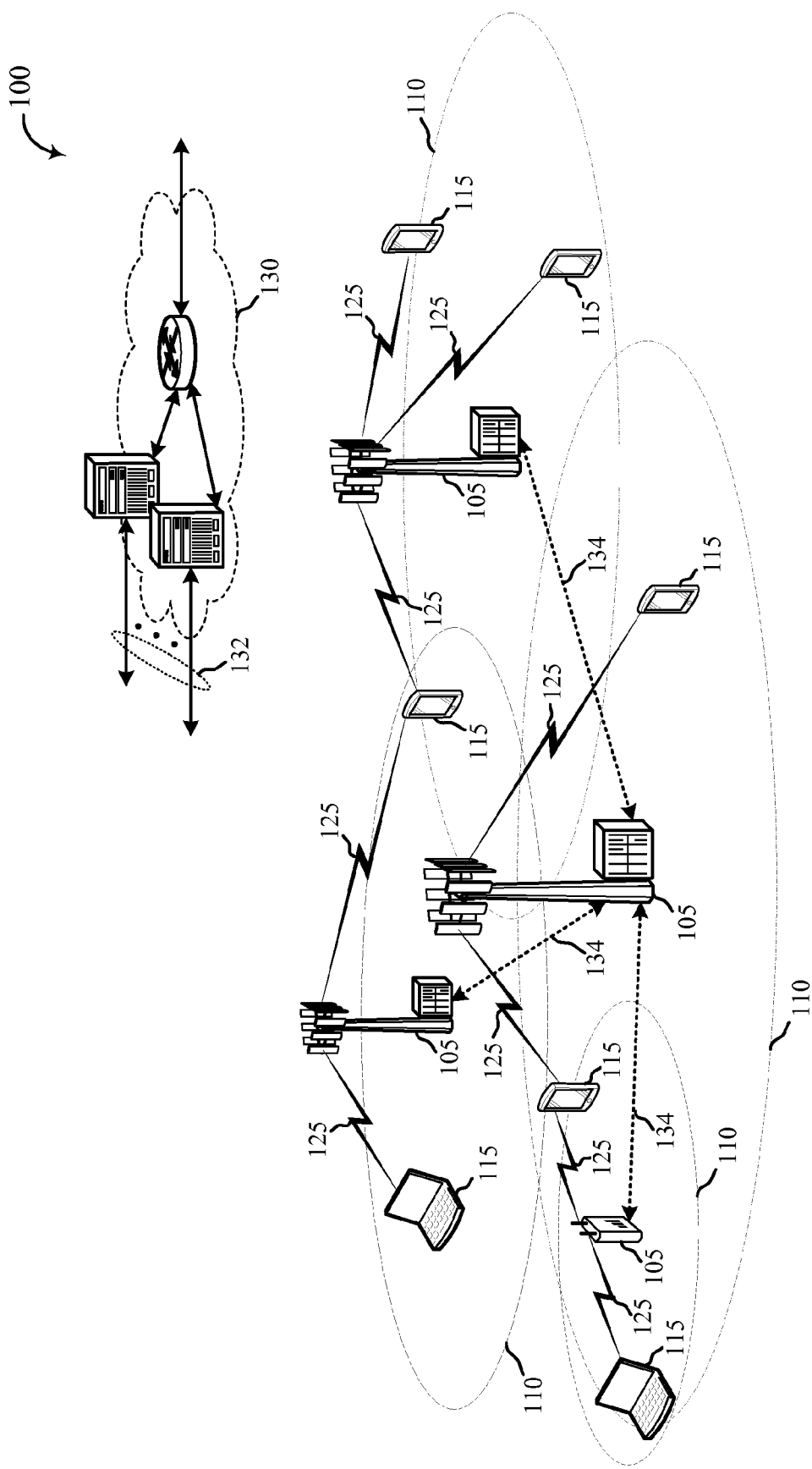
FIG. 1 shows a block diagram of a wireless communication system, in accordance with various aspects of the present disclosure.

FIG. 1 illustrates an example of a wireless communications system 100 in accordance with various aspects of the disclosure. The wireless communications system 100 includes base stations 105, UEs 115, and a core network 130. The core network 130 may provide user authentication, access authorization, tracking, Internet Protocol (IP) connectivity, and other access, routing, or mobility functions. The base stations 105 interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up a portion of the coverage area (not shown). The wireless communications system 100 may include base stations 105 of different types (e.g., macro and/or small cell base stations). There may be overlapping geographic coverage areas 110 for different technologies. A UE 115 that moves from one geographic coverage area 110 to another may re-connect with different base stations 105 by participating in a handoff procedure. The handoff procedure may occur just after a UE 115 awakens from a sleep mode and thus delay the ability of the UE 115 to participate in certain activities such as monitoring DL channels for paging messages.

In some examples, the wireless communications system 100 is an LTE/LTE-A network. In LTE/LTE-A networks, the term evolved Node B (eNB) may be generally used to describe the base stations 105, while the term UE may be generally used to describe the UEs 115. The wireless communications system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid Automatic Repeat Request (HARQ) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 are dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

For example, a UE 115 may communicate with a base station 105 by receiving an eI-DRX configuration, as described in greater detail below. The eI-DRX configuration may provide for an eI-DRX cycle that is several minutes long. The UE 115 may also communicate with a base station 105 by receiving paging messages from the base station 105. If, however, the UE 115 is in a sleep mode in accordance to the received eI-DRX configuration and is also mobile, meaning that the UE 115 could move between geographic coverage areas 110 of different base stations 105, it is possible that the UE 115 may awaken from its sleep mode and discover that the UE 115 has need to re-select a base station 105 for communications. The re-select and connection time with a new base station 105 could result in the UE 115 missing paging messages that it would likely have received had the UE 115 either remained in its original geographic coverage area 110 or not been operating under its received eI-DRX cycle.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures for FDD (e.g., frame structure type 1) and TDD (e.g., frame structure type 2) may be defined.

LTE/LTE-A utilizes orthogonal frequency division multiple-access (OFDMA) on the downlink and single-carrier frequency division multiple-access (SC-FDMA) on the uplink. An OFDMA and/or SC-FDMA carrier may be partitioned into multiple (K) orthogonal sub-carriers, which are also commonly referred to as tones, bins, or the like. Each sub-carrier may be modulated with information. The spacing between adjacent sub-carriers may be fixed, and the total number of sub-carriers (K) may be dependent on the carrier bandwidth. For example, K may be equal to 72, 180, 300, 600, 900, or 1200 with a sub-carrier spacing of 15 kilohertz (KHz) for a corresponding carrier bandwidth (with guard band) of 1.4, 3, 5, 10, 15, or 20 megahertz (MHz), respectively. The carrier bandwidth may also be partitioned into sub-bands. For example, a sub-band may cover 1.08 MHz, and a carrier may have 1, 2, 4, 8 or 16 sub-bands.

In some embodiments of the wireless communications system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. The term 'component carrier' (CC) may refer to each of the multiple carriers utilized by a UE in CA operation, and may be distinct from other portions (e.g., other carriers, etc.) of system bandwidth. In CA operation, a UE 115 may be configured to utilize multiple downlink and/or uplink CCs concurrently to provide greater operational bandwidth and, e.g., higher data rates. CCs used in CA operation may be any suitable bandwidth (e.g., 1.4, 3, 5, 10, 15, or 20 megahertz (MHz), etc.), and each individual CC may provide the same capabilities as, for instance, a single carrier based on Release 8 or Release 9 of the LTE standard. Thus, individual CCs may be backwards compatible with UEs 115 implementing LTE Release 8 or Release 9, while also being utilized by UEs 115 implementing LTE versions after Release 8/9 configured for CA or in single carrier mode. Alternatively, a CC may be configured to be used in combination with other CCs and may not carry some channels used to support single carrier mode (e.g., format or control channels, etc.). CA may be used with both FDD and TDD component carriers.

In LTE/LTE-A, radio frames for each cell are indexed by a subframe number (SFN). Because the SFN has ten bits and each radio frame is 10 ms long, each frame cycle of 1024 radio frames spans 10.24 s. The eight most significant bits of the SFN are broadcast in a master information block (MIB) that is transmitted in each radio frame. The two least significant bits can be deduced from the four radio frame cycle used to transmit one complete broadcast channel (BCH) transmission time interval (TTI). As discussed in further detail below, in some instances, additional bits may be included in an SFN to extend the frame cycle for a set of subframes having SFN of a given length. The additional bits, for example, may be appended to the legacy SFN length of ten bits. In some aspects, a ten-bit legacy SFN may be extended by six bits to enable a frame cycle to span approximately 655.36 seconds. The longer frame cycle may facilitate implementation of a longer idle mode DRX cycle, or eI-DRX.

UEs 115 may be identified by a permanent subscriber identity such as an international mobile subscriber identity (IMSI), which may be stored in a module (e.g., subscriber identity module (SIM), etc.), which may be removable or permanently installed in the UE 115. Generally, a UE 115 may be either in an idle mode (RRC_Idle) or a connected mode (RRC_Connected). In the idle mode, the UE 115 performs cell selection and reselection and registers itself within the network, but does not actively communicate user data. The UE 115 also listens to paging messages in idle mode to identify, receive, or process incoming data (e.g., calls, etc.), changes in system information, and notifications (e.g., emergency notifications, etc.). Monitoring for paging messages includes monitoring the PDCCH at predetermined intervals for paging control messages scrambled with a paging radio network temporary identifier (P-RNTI). If found, the paging control messages provide a pointer to a paging message for paging information for the UE 115. The process of monitoring the PDCCH discontinuously for paging control messages during the idle state is known as idle discontinuous reception (I-DRX).

When a paging message is received, the UE 115 performs a random access procedure to transition to the connected mode for transfer of data between the base station 105 and UE 115. In connected mode, the UE 115 continuously monitors the PDCCH according to a cell radio network temporary identifier (C-RNTI) assigned by the base station 105 in the connection procedure. In some instances, the UE 115 may also be configured for DRX operation in connected mode, known as connected DRX (C-DRX).

In I-DRX, the UE 115 monitors the PDCCH for paging according to a paging cycle determined by the DRX cycle. Each cell broadcasts a cell-specific DRX cycle that has a value of 32, 64, 124, or 256. A UE 115 can request a different UE-specific DRX cycle within an attach request. The range of values that the UE can request are the same as the available values for the cell-specific DRX cycle. Thus, the maximum DRX cycle in LTE is 2.56 s.

A subframe where a paging control message may be addressed to the UE 115 with the P-RNTI is known as a paging occasion (PO). A paging frame (PF) is a radio frame which contains one or more POs. The PF is determined by the DRX parameters as subframes that satisfy the following formula:

$$SFN \bmod T = (T \text{ div } N) * (UE\_ID \bmod N)$$

where:

T: DRX cycle of the UE. T is the shortest of the UE specific DRX value, if assigned, and the default DRX value broadcast by the cell.

nB: number of paging occasions in a cell specific DRX cycle (4T, 2T, T, T/2, T/4, T/8, T/16, T/32).

N: min(T, nB)

UE_ID: IMSI mod 1024

An index i_s pointing to a PO within a subframe pattern shown in Tables 1 and 2 below is derived from the following formula:

$$i\_s = \text{floor}(UE\_ID/N) \bmod Ns$$

where:

Ns: max(1,nB/T).

TABLE 1

| | PO(s) for FDD | | | |
|---|---|---|---|---|
| Ns | i_s = 0 | i_s = 1 | i_s = 2 | i_s = 3 |
| 1 | 9 | N/A | N/A | N/A |
| 2 | 4 | 9 | N/A | N/A |
| 4 | 0 | 4 | 5 | 9 |

TABLE 2

| | PO(s) for TDD | | | |
|---|---|---|---|---|
| Ns | i_s = 0 | i_s = 1 | i_s = 2 | i_s = 3 |
| 1 | 0 | N/A | N/A | N/A |
| 2 | 0 | 5 | N/A | N/A |
| 4 | 0 | 1 | 5 | 6 |

While the current I-DRX mechanism may be sufficient for devices such as smartphones where a high degree of connectivity is desired, some devices may have different power and connectivity requirements that make the current maximum DRX cycle inefficient. For example, devices such as machine type communications devices may be active infrequently and may have a more limited power budget. Machine type communications (MTC) may refer to communication involving at least one remote device on at least one end of the communication and may include forms of data communication which involve one or more entities that do not necessarily need human interaction. Some UEs may be considered machine-type communication (MTC) UEs, which may include remote devices, such as sensors, meters, location tags, etc., that may communicate with a base station, another remote device, or some other entity. MTC UEs may include UEs that are capable of MTC communications with MTC servers and/or other MTC devices through Public Land Mobile Networks (PLMNs), for example.

One proposed solution allows UEs to enter a Power Saving Mode (PSM) when an active timer expires after transitioning from connected mode to idle-mode. In the PSM, the UE is unreachable for paging and stops access stratum activities. PSM is exited if mobile originated (MO) data is generated or based upon a periodic tracking area update (TAU) timer. The active timer and periodic TAU timer can be negotiated by the UE and the eNB. However, upon exiting PSM, the UE performs a TAU procedure, which includes a random access procedure to exchange RRC signaling and non-access stratum (NAS) signaling for updating the tracking area assigned to the UE. Thus, this procedure incurs substantial power consumption in the TAU procedure at the end of each PSM period.

The components of wireless communications system 100, such as the UEs 115 and base stations 105, may be configured for extended DRX (e-DRX) operation using hyper-SFN extension signaling. The hyper-SFN extension signaling may extend the SFN range while maintaining backward compatibility (e.g., on the same cell) for legacy UEs not configured to use the extended SFN range. The hyper-SFN extension signaling may include an index to a hyper-SFN transmitted as part of system information. UEs configured to use the hyper-SFN (e.g., non-legacy UEs) may effectively use a longer or extended SFN index to an extended SFN range that includes the legacy SFN range and the hyper-SFN range. The hyper-SFN extension may be used in an extended idle DRX (eI-DRX) mode which may coexist with existing I-DRX mode on the same paging resources. Additionally or alternatively, paging may be differentiated for eI-DRX mode UEs using separate paging occasions (POs) or a new paging RNTI. For clarity, the present disclosure describes techniques for extended DRX operation applied to I-DRX operation. However, the described techniques for extending DRX operation using hyper-SFN extension signaling can be applied to C-DRX operation, in some instances.

Figure 2:
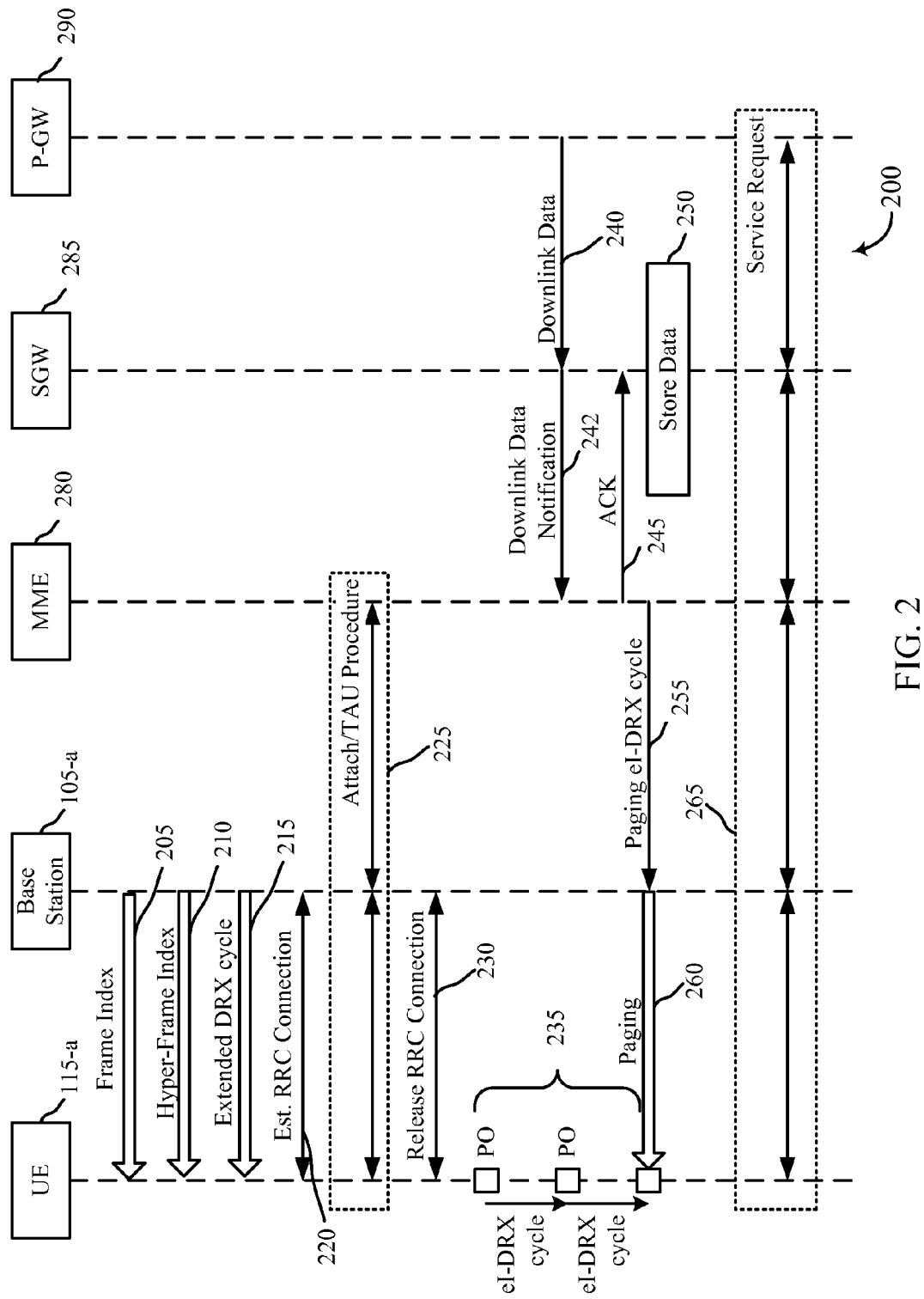
FIG. 2 shows a flow diagram illustrating an example of hyper-subframe number (SFN) extension signaling, in accordance with various embodiments.

FIG. 2 shows a flow diagram 200 illustrating an example of hyper-SFN extension signaling in accordance with various aspects of the present disclosure. Flow diagram 200 may illustrate, for example, a message flow for a UE 115-a configured to use hyper-SFN signaling for eI-DRX operation (e.g., non-legacy UE). The non-legacy UE 115-a may be an example of one of the UEs 115 illustrated in FIG. 1.

An base station 105-a, which may be an example of one of the base stations 105 of FIG. 1, is shown in the flow diagram 200. Flow diagram 200 also shows a mobility management entity (MME) 280, a serving gateway (SGW) 285, and a packet gateway (P-GW) 290, which may be part of the core network 130 illustrated in FIG. 1.

The base station 105-a may broadcast the frame index 205, which may be an index to a legacy SFN range. For example, the base station 105-a may transmit the eight most-significant bits of the SFN in the MIB. The MIB may be transmitted via the physical broadcast channel (PBCH).

Figure 3:
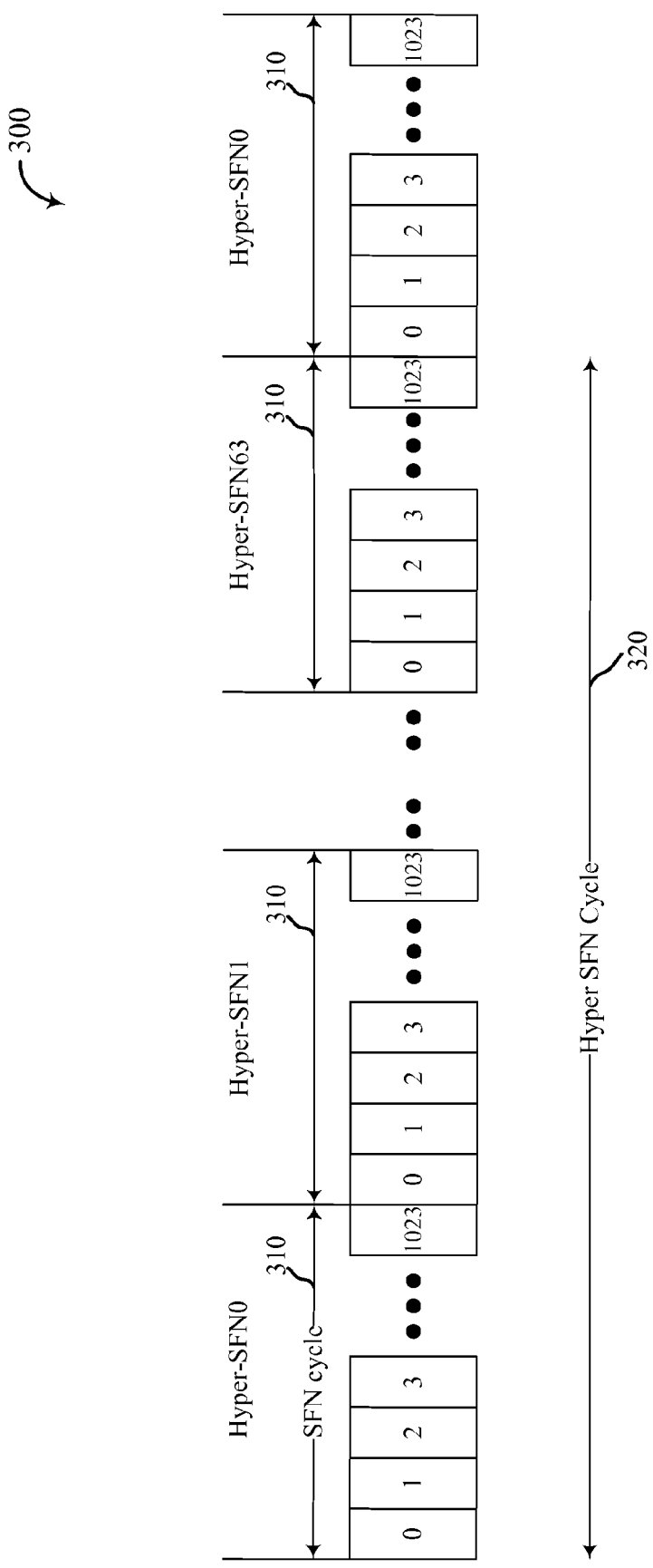
FIG. 3 shows a timing diagram of example hyper-SFN frame timing, in accordance with various embodiments.

The base station 105-a may also broadcast the hyper frame index 210. The hyper frame index 210 may be broadcast by transmitting an index to the hyper-SFN as part of a system information block (SIB) that is different from the MIB. For example, the index to the hyper-SFN may be transmitted in SIB1 or SIB2. SIB1 and SIB2 may be transmitted via a data channel (e.g., PDSCH). The number of bits in the hyper-SFN may be selected to provide an extended SFN that provides a desired range in eI-DRX operation. For example, the hyper-SFN may extend the SFN by six bits, which enables a hyper-SFN span of 655.36 s (approximately 11 minutes). FIG. 3 shows a timing diagram 300 of example extended SFN frame timing in accordance with various aspects of the present disclosure. Timing diagram 300 illustrates a six-bit hyper SFN cycle 320 including 64 SFN cycles 310, where each SFN cycle 310 includes 1024 frames. Thus, the extended SFN cycle, indexed by the hyper SFN and legacy SFN, spans 65,536 frames. Other bit lengths (e.g., 4, 5, 7, 8, 10, etc.) for the hyper-SFN may be selected as appropriate or desired.

Returning to FIG. 2, the base station 105-a may also broadcast an extended DRX cycle 215. The broadcast extended DRX cycle 215 may indicate the default extended DRX cycle for an eI-DRX paging cycle. The extended DRX cycle 215 may be transmitted in a SIB (e.g., SIB1, SIB2, etc.) and may have the same number of bits as the hyper-SFN.

As shown in flow diagram 200, the UE 115-a may establish an RRC connection with the base station 105-a at 220. The UE 115-a may perform network attachment and tracking area update (TAU) at 225. The network attachment and TAU procedure may include authentication of the UE 115-a on the network, security setup, and assignment of network resources (e.g., MME 280, bearers, etc.) for communication via the network.

Where no communication activity is on-going, the UE 115-a may release the RRC connection at 230. The UE 115-a may then enter eI-DRX mode of operation for receiving paging from the network at 235. Thus, the UE 115-a may follow the determined PFs and Paging Occasions (POs) for eI-DRX operation at 235. Determining PFs and POs for eI-DRX operation is discussed in more detail below.

Downlink data 240 for the UE 115-a may be received and transferred from the P-GW 290 to the SGW 285. The SGW 285 may notify the MME 280 of the downlink data at 242. The MME 280 may acknowledge the downlink data notification 242 at 245. The SGW 285 may then store the downlink data at 250.

The MME 280 may send paging messages 255 to base stations 105 within the tracking area for UE 115-a. The base station 105-a may broadcast a paging message 260 at a PO for the UE 115-*a* determined according to the eI-DRX paging cycle. The UE may receive the paging message 260 and the downlink data 240 may be transferred in the communications for the service request at 265.

Figure 4:
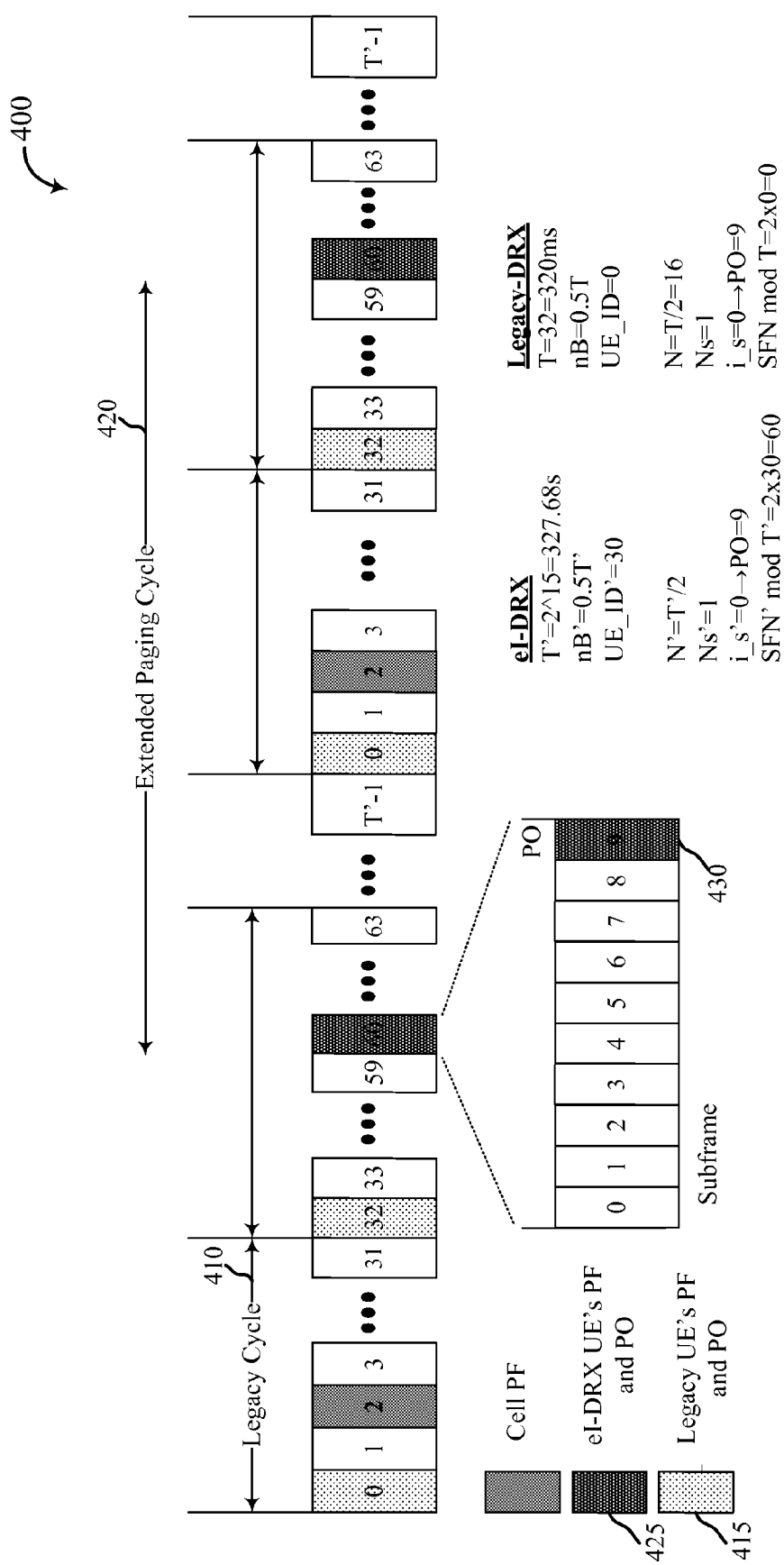
FIG. 4 shows a timing diagram of example legacy DRX and eI-DRX operation, in accordance with various embodiments.

FIG. 4 shows a timing diagram 400 of example legacy DRX and eI-DRX operation in accordance with various aspects of the present disclosure. For legacy DRX operation, the DRX cycle T=32 frames (320 ms) and the paging occasion parameter nB=T/2. Thus, for a legacy UE with UE_ID=0, the legacy UE PFs 415 are radio frames where the SFN mod 32=0.

For eI-DRX operation, the PFs and POs may be determined by the following formulae, with the eI-DRX parameters provided in system information (e.g., MIB, SIB1, SIB2, etc.).

PF' may be paging subframes for eI-DRX operation that satisfy:

$$SFN' \bmod T' = (T' \operatorname{div} N')*(UE\_ID' \bmod N')$$

Index i_s' for determining PO' (e.g., from Tables 1 and 2 above) may be given by:

$$i\_s' = \operatorname{floor}(UE\_ID'/N') \bmod Ns'$$

where:
T': eI-DRX cycle of the UE. T' may be the shortest of a UE specific eI-DRX value, if assigned, and the default eI-DRX value broadcast by the cell.
nB': number of paging occasions in an eI-DRX cycle (4T', 2T', T', T'/2, T'/4, T'/8, T'/16, T'/32).
N': min(T', nB')
Ns': max(1,nB'/T')
UE_ID': IMSI mod $2^n$ In timing diagram 400, the eI-DRX cycle T'=$2^{15}$=32768=327.68 s and the paging occasion parameter nB' for eI-DRX operation is T'/2=0.5T'. While the paging occasion parameter nB' is shown defined by the same coefficient as the paging occasion parameter nB for legacy DRX operation (e.g., 0.5) in FIG. 4, the parameter nB' may have a different coefficient. The paging occasion parameter nB' for eI-DRX operation may, for example, be transmitted (e.g., in SIB1 or SIB2, etc.) separately from the paging occasion parameter nB for legacy DRX operation.

For a non-legacy UE 115 in eI-DRX operation as shown in FIG. 4, the UE_ID' may be 30. The UE_ID' may be provided with an extended range when compared to the UE_ID for legacy UEs due to the increase in paging frames in the hyper SFN range used for eI-DRX operation. For example, the UE_ID' may be defined as UE_ID'=(IMSI mod $2^n$), where n may be determined based on the legacy SFN range $R_{LEGACY}$ and/or hyper SFN range $R_{HYPER}$. For example, n may be determined as n=$\log_2(R_{LEGACY})+\log_2(R_{HYPER})$+c, where c may account for the possibility of multiple (e.g., 2, 4, etc.) paging occasions per eI-DRX cycle. In one embodiment, the number of paging occasions in an eI-DRX cycle may have a range of values of (4T', 2T', T', T'/2, T'/4, T'/8, T'/16, T'/32), and the parameter c may be 2. Thus, for a hyper-SFN cycle having 64 frame cycles ($R_{HYPER}$=64), where each frame cycle is a legacy frame cycle including 1024 radio frames, n may be equal to 18.

As illustrated in FIG. 4, the example non-legacy UE 115 may have an extended paging cycle 420 of T'=327.68 s and PFs 425 for eI-DRX defined by radio frames having SFN' mod T'=2*UE_ID'=60. The POs 430 within PFs 425 may be given by Tables 1 and 2 according to i_s'=0.

As described above, the cell may broadcast a default eI-DRX cycle value. Additionally or alternatively, a non-legacy UE 115 may request a different UE-specific eI-DRX cycle value (e.g., via RRC signaling, etc.). As described above, the value of T' used for determining the extended paging cycle and paging frames may be the shortest of the UE specific eI-DRX cycle value, if assigned, and the default eI-DRX cycle value broadcast by the cell.

In some cases, it may be desirable to differentiate paging for legacy UEs using the legacy I-DRX mode and non-legacy UEs using the eI-DRX mode. In some embodiments, separate paging frames or paging occasions may be defined for eI-DRX mode. For example, different tables may be used for defining POs for eI-DRX mode from the index i_s'. Additionally or alternatively, an extended paging RNTI (eP-RNTI) may be used for eI-DRX UEs. The eP-RNTI may be statically defined or may be broadcast by the cell in system information (e.g., SIB1, SIB2, etc.).

Generally, changes to system information broadcast over the broadcast control channel (BCCH) can occur according to modification period boundaries. The modification period is defined by the default DRX cycle multiplied by a modification period coefficient (e.g., 2, 4, 8, 16). When system information updates are due to occur, base stations 105 generally broadcast paging messages to each UE during a previous modification period for changes applied to the next modification period.

In some cases, UEs using eI-DRX mode may not have a paging occasion during each modification period for system information. Thus, non-legacy UEs may miss notification of changes in system information if the eI-DRX cycle is greater than the modification period. In embodiments, eNBs supporting eI-DRX utilize an extended system information modification period based on the eI-DRX cycle. For example, the extended system information modification period may be equal to the default eI-DRX cycle broadcast for the cell.

Figure 5:
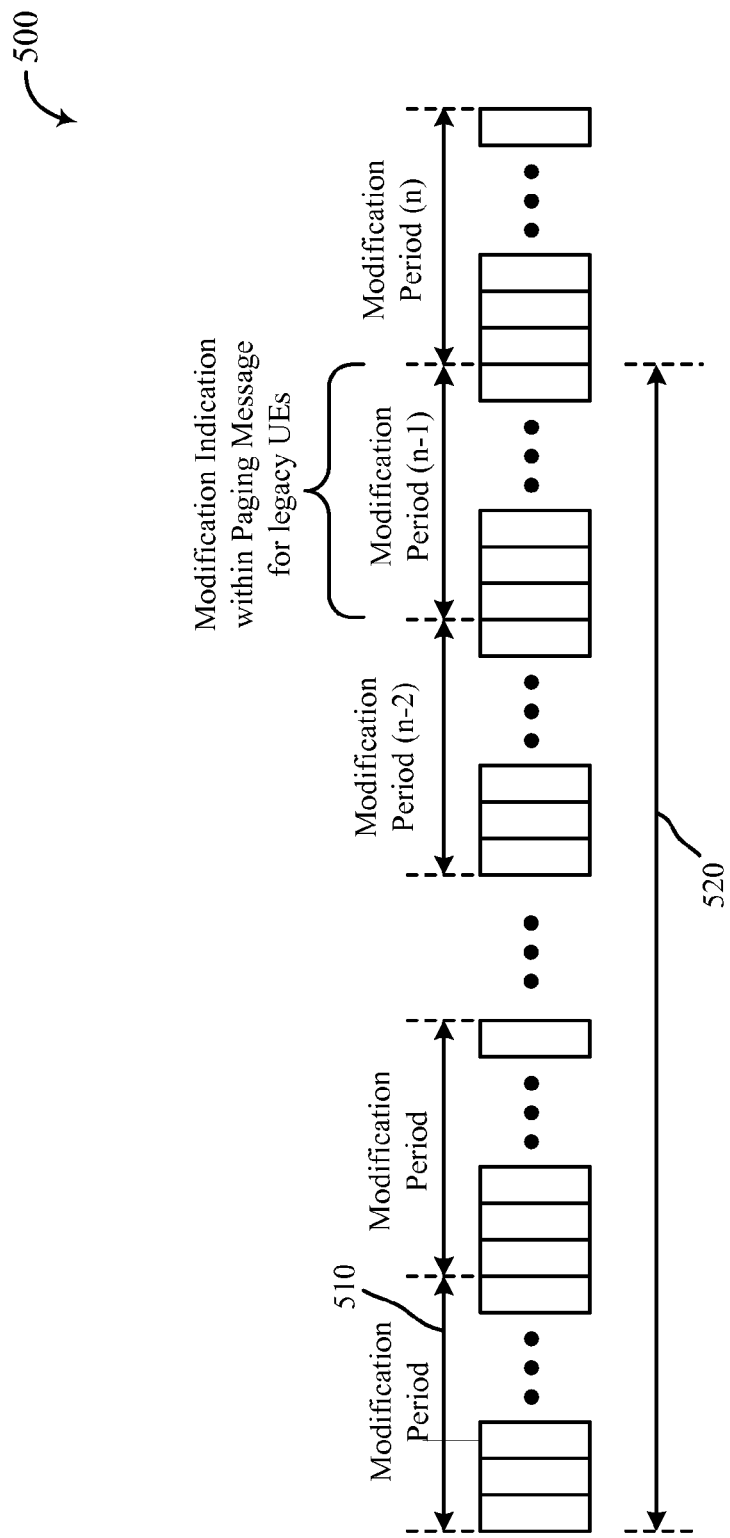
FIG. 5 shows a timing diagram illustrating an example of an extended system information modification period, in accordance with various embodiments.

FIG. 5 shows a timing diagram 500 illustrating an example of an extended system information modification period 520 in accordance with various aspects of the present disclosure. As shown in timing diagram 500, an extended system information modification period 520 may span a number of legacy modification periods 510. As shown in FIG. 5, modification indications for legacy UEs may be sent in paging messages during a modification period (n−1) for modifications occurring on the boundary of modification period (n−1) and modification period (n). Modification period (n−1) may be the last modification period 510 within the extended system information modification period 520.

As described above, non-legacy UEs in eI-DRX mode may have one paging frame during the extended system information modification period 520. However, modifications may not occur until the end of the extended system information modification period 520. The non-legacy UEs may monitor for the updated system information in various ways. In one example, a modification indication for non-legacy UEs in eI-DRX mode may indicate an offset (e.g., number of modification periods 510, number of frames, etc.) until the system information modification is due to occur. In this manner, the non-legacy UEs in eI-DRX mode may remain in a low-power state until the system information modification is due to occur. Alternatively, non-legacy UEs in eI-DRX mode may, upon receiving a paging message with a modification indication during the extended system information modification period 520, monitor system information for each modification period until a change in system information is detected. The configured system information for the UE may then be updated based on the changed system information. In yet other embodiments, non-legacy UEs in eI-DRX mode may, upon receiving a paging message with a modification indication during the extended system information modification period 520, switch to operation according to the legacy I-DRX mode until a second paging message with a second modification indication is detected during modification period (n−1). Alternatively, UEs in eI-DRX may also periodically check for system information updates at multiples of their paging occasion intervals.

While operating under an eI-DRX cycle has many significant power saving benefits, long eI-DRX cycles may result in certain challenges as well. As explained above, a mobile UE operating under an eI-DRX cycle may run the risk of being moved between base station coverage areas while the UE is effectively asleep. This means that when the UE awakes and attempts to reconnect with a base station in order to monitor for DL traffic such as paging messages, the UE may find that it should first re-connect with a base station that is different from the base station to which the UE had been connected prior to entering its power saving mode.

Figure 6:
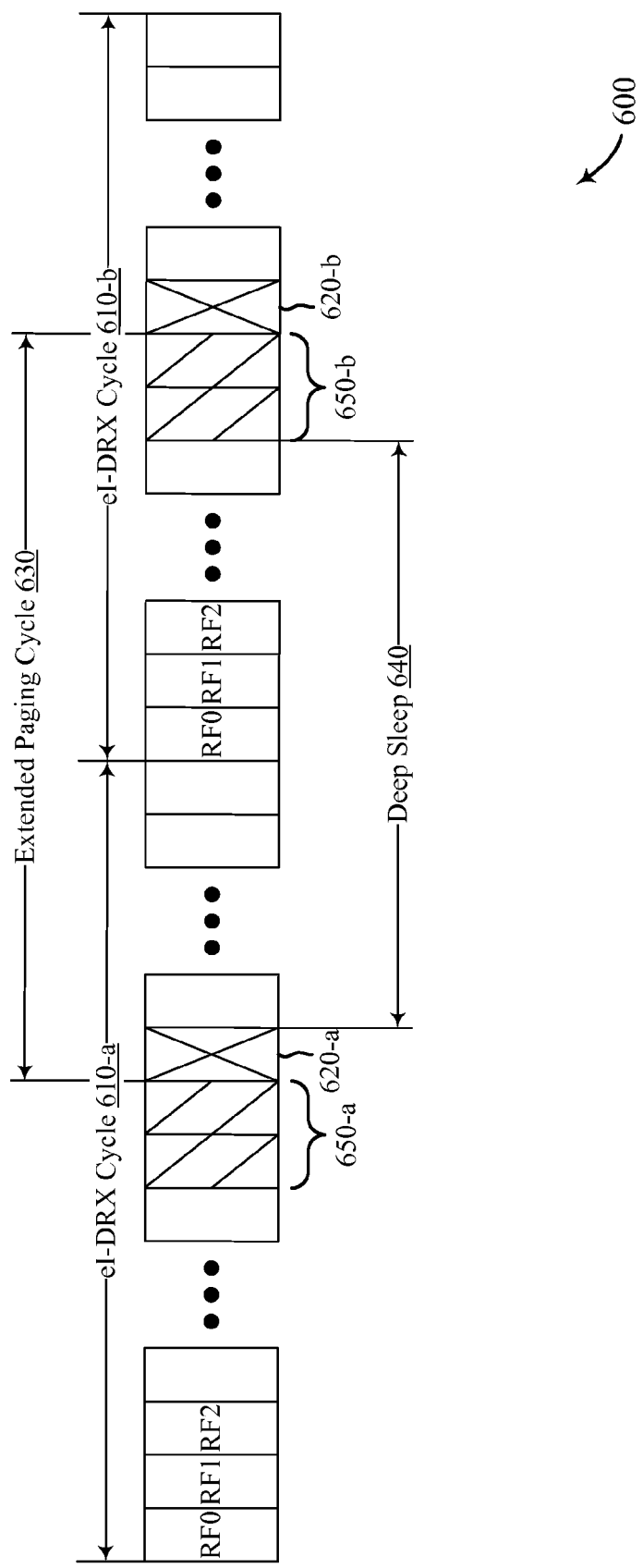
FIG. 6 shows an example of an extended paging cycle timing diagram, in accordance with various aspects of the present disclosure.

FIG. 6 illustrates one solution to this challenge introduced by use of an eI-DRX cycle. FIG. 6 shows an example of an extended paging cycle timing diagram 600, in accordance with various aspects of the present disclosure. The extended paging cycle timing diagram 600 illustrates two eI-DRX cycles 610-*a*, 610-*b* that are each divided into a series of radio frames RF (e.g., RF0, RF1, RF2, etc.). The eI-DRX cycle 610-*a* includes a paging frame 620-*a*. The eI-DRX cycle 610-*b* includes a paging frame 620-*b*. The interval between the paging frames 620-*a*, 620-*b* defines the extended paging cycle 630. The extended paging cycle timing diagram 600, or at least portions of it, may be used by either a UE 115 or a base station 105, such as those described with reference to FIG. 1.

A UE 115 may awaken just in time to participate in a paging occasion in paging frame 620-*a*. After participating in the paging occasion (PO), the UE 115 may return to a deep sleep mode 640 and remain in this mode until the end of the extended paging cycle 630, at which time the UE 115 may once again awaken in order to participate in a paging occasion in paging frame 620-*b*. However, as explained above, by awaking just in time for the paging frames 620, the UE 115 risks not having sufficient time to re-select a new base station before participating in the paging occasion, in the event that a new base station is or could be selected, resulting in missing a paging occasion.

Therefore, in the extended paging cycle timing diagram 600, the UE 115 awakens early from its deep sleep mode 640. Frames 650 represent a pre-wake-up interval which occurs just before the paging frames 620. For example, frames 650-*a* occur just before paging frame 620-*a*, and frames 650-*b* occur just before paging frame 620-*b*. When a UE 115 operates in accordance with the extended paging cycle timing diagram 600, the UE awakens early from its deep sleep and performs its base station selection or re-selection measurements during the pre-wake-up frames 650. This allows the UE 115 time to perform the base station selection or re-selection measurements and connect to an appropriate base station 105 in time to participate in a paging occasion in paging frame 620.

The timing and number or duration of the pre-wake-up frames 650 may be determined by the UE 115, based on its specifications and components which may affect the length of time for the UE to perform selection or re-selection measurements. Alternatively, a base station 105 could broadcast a configuration for the pre-wake-up frames 650 via an SIB, for example. The UE 115 that receives the broadcast SIB can then use the set number of pre-wake-up frames 650 to perform its base station selection or re-selection measurements.

Figure 7A:
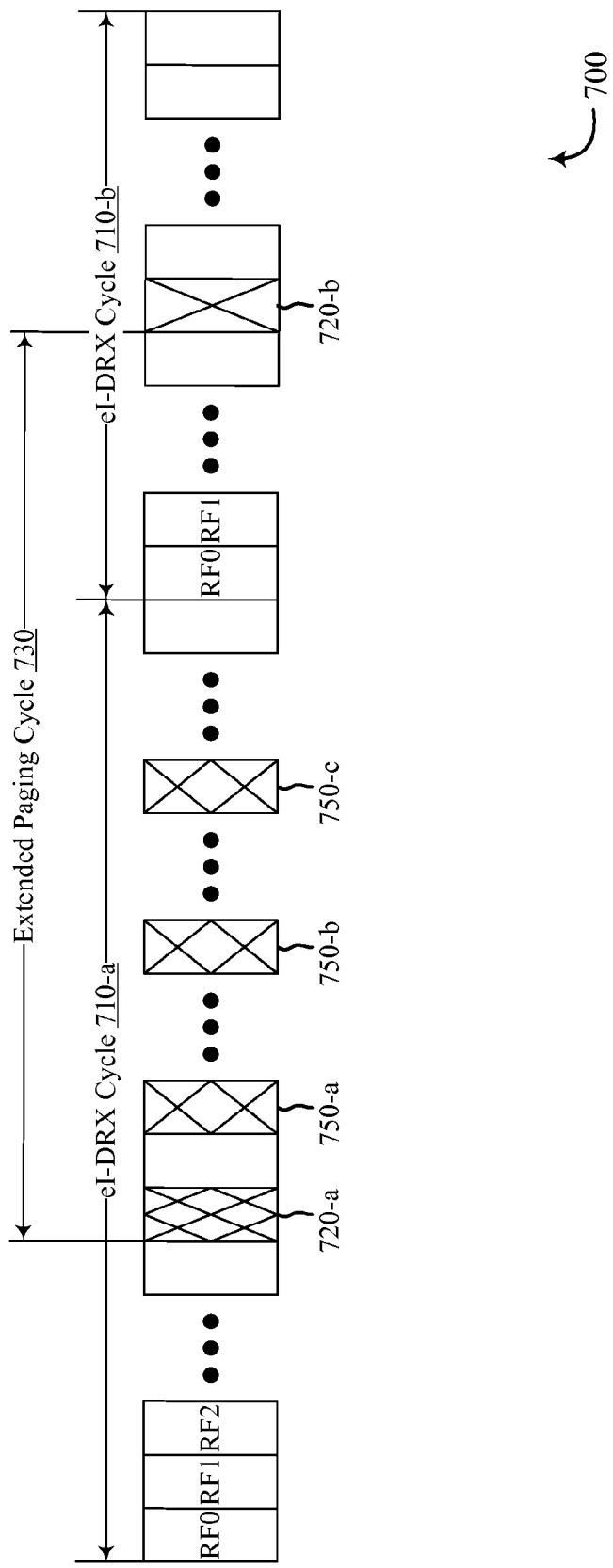
FIGS. 7A and 7B show examples of extended paging cycle timing diagrams, in accordance with various aspects of the present disclosure.

FIG. 7A shows an additional example of an extended paging cycle timing diagram 700, in accordance with various aspects of the present disclosure. The extended paging cycle timing diagram 700 illustrates another option for ensuring that a UE 115 does not miss a paging occasion when awaking from a deep sleep of an eI-DRX cycle. The extended paging cycle timing diagram 700, or at least portions of it, may be used by either a UE 115 or a base station 105, such as those described with reference to FIG. 1, and may also be used in conjunction with the extended paging cycle timing diagram 600 of FIG. 6.

The extended paging cycle timing diagram 700 illustrates two eI-DRX cycles 710-*a*, 710-*b* that are each divided into a series of radio frames RF (e.g., RF0, RF1, RF2, etc.). The eI-DRX cycle 710-*a* includes a paging frame 720-*a*. The eI-DRX cycle 710-*b* includes a paging frame 720-*b*. The interval between the paging frames 720 defines the extended paging cycle 730. The extended paging cycle timing diagram 700 also includes additional legacy paging frames 750 (including legacy paging frames 750-*a*, 750-*b* and 750-*c*). Legacy paging frames 750 represent additional opportunities for a UE 115 to participate in a paging occasion in the event that the UE 115 misses paging frame 720-*a*.

In the extended paging cycle timing diagram 700, the UE 115 awakens and, due to a delay caused by engaging in base station re-selection measurements, the UE 115 may miss the paging occasion in paging frame 720-*a*. However, in this scenario, the core network 130 (of FIG. 1), in the form of an MME, for example, may recognize that the UE 115 has missed its paging frame 720-*a*. As a result, the core network 130 may instruct local area base stations 105 (e.g., base stations within an MME tracking area) to continue to send paging messages to the UE 115 in accordance with a short paging cycle 740. The short paging cycle 740 may be defined by a duration as well as a number of times that the short paging cycle 740 should be repeated. In this way, a base station 105 will not endlessly repeat transmission of a paging message to the UE 115 over a short paging cycle, but will instead eventually terminate transmission of the paging message. Termination may occur as a result of the base station 105 receiving an indication from the UE 115 that the UE 115 has received the paging message. Alternatively, termination may occur as a result of the core network 130 receiving an indication from the UE 115 that the UE 115 has received the paging messages and as a result of the core network 130 notifying the base station 105. Termination may also occur when the maximum number of short paging cycles is reached without any notification that the paging message was received.

The UE 115 may also be configured to determine whether the UE 115 missed the paging occasion in paging frame 720-*a* and, if so, continue to monitor for legacy paging frames 750. After monitoring the legacy paging frames 750, the UE 115 may return to its received eI-DRX cycle 710-*a* before awaking again in time for paging frame 720-*b*.

Figure 7B:
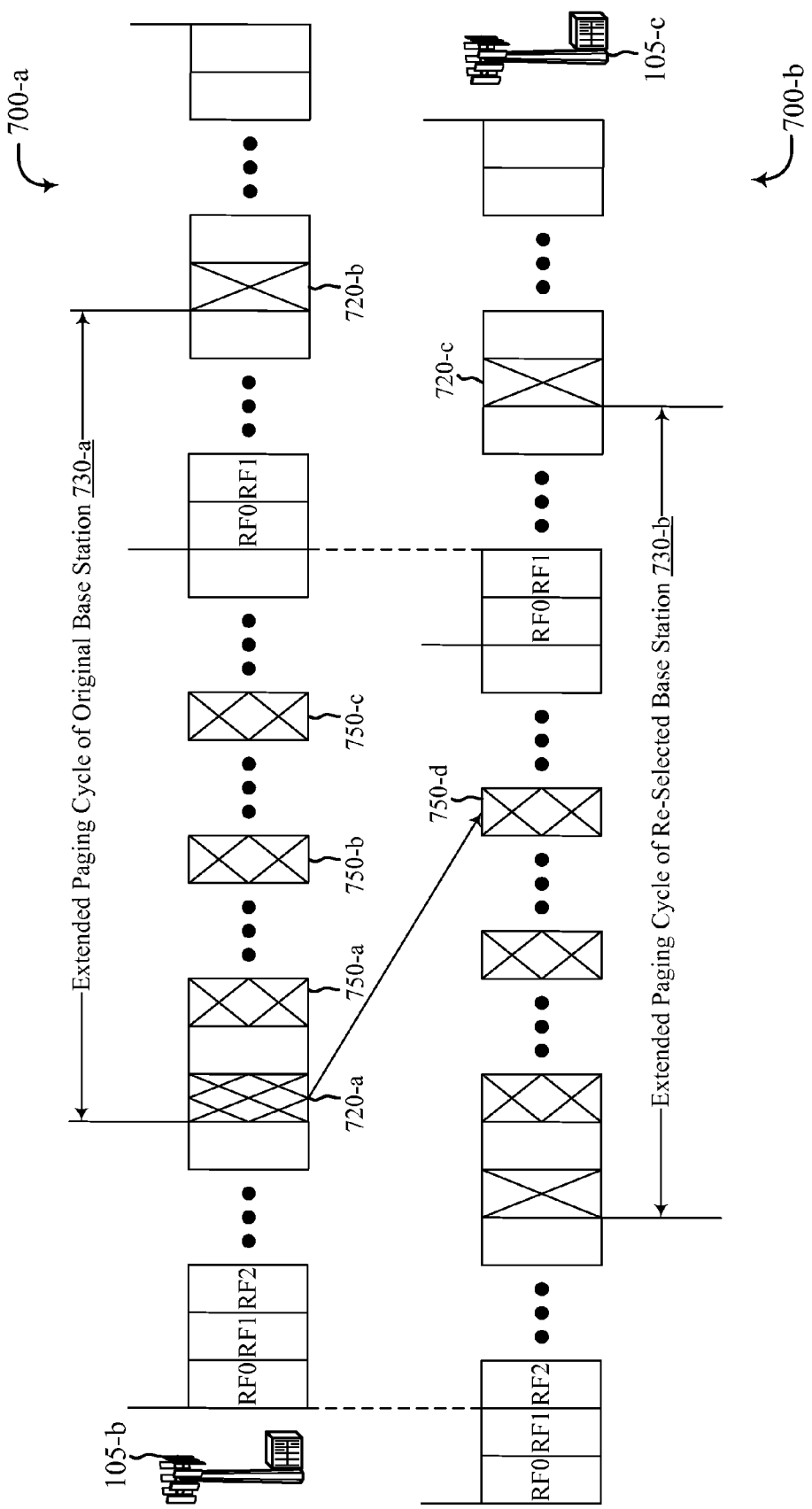

FIG. 7B shows an application of the example extended paging cycle timing diagram 700 of FIG. 7A when a UE 115 selects a new base station for receiving and transmitting messages. FIG. 7B, then, includes a timing diagram 700-*a* used with an original base station 105-*b*, and a timing diagram 700-*b* used with a newly selected base station 105-*c*. The timing diagrams 700-*a* and 700-*b* may be hyper-SFN synchronized or may be slightly offset in time. The synchronized or nearly-synchronized base stations allow a UE that has missed a paging frame 720-a to still have time to select a newly selected base station 105-c and then to monitor the legacy paging frames 750 transmitted by the newly selected base station 105-c. Thus, in the example illustrated in FIG. 7B, the UE 115 misses the paging frame 720-a (part of the extended paging cycle of the original base station 105-b), but participates in a paging operation in legacy paging frame 750-d with the newly selected base station 105-c during the extended paging cycle 730-b.

The core network 130 may instruct each base station 105 in the MME tracking area to be synchronized in eI-DRX cycles and in the transmission of paging messages to the UE 115. In this situation, the UE that has moved from one base station to another need not wait a full eI-DRX cycle to receive a transmitted paging message, but may instead receive the paging message via legacy paging frames 750 on a short paging cycle used by a base station other than the UE's original base station 105-b. Once the UE 115 has received its paging message (or participated in a paging occasion), then the UE 115 may return to an eI-DRX cycle with its newly-selected base station 105-c and eventually awaken in time for the next paging frame 720-c.

Additionally, a UE 115 could postpone re-selecting a base station 105 until after the UE 115 has performed a system access and connected with an original base station 105-b, as long as the communications with the original base station 105-b are sufficiently strong to allow reception of a paging message. Thus, using again the example of FIG. 7B, a UE 115 that misses paging frame 720-a because it is performing base station selection or re-selection measurements may delay switching to the newly selected base station 105-c until after the UE 115 participates in a paging occasion on one of legacy paging frames 750-a, 750-b, or 750-c of the original base station 105-b.

In this example, the UE 115 could utilize the extended paging cycle of the original base station 105-b as long as the signal strength of the original base station is above a predetermined minimum signal strength threshold, even if the signal strength of the original base station 105-b is less than a signal strength of the newly selected base station 105-c to which the UE 115 will transition. If the signal strength of the original base station 105-b is below the predetermined minimum signal strength threshold, the UE 115 will simply transition to the newly selected base station 105-c and participate in a system access using a legacy paging frame 750 of the extended paging cycle of the newly selected base station 105-c.

An additional option for mitigating the effect of UE mobility in conjunction with eI-DRX cycles is for a UE 115 to, during an initial connection with a base station 105, request an adjusted eI-DRX cycle based on the UE's mobility. A lower UE mobility can mean that a UE 115 can request a longer eI-DRX cycle. A higher UE mobility can result in a UE 115 requesting a shorter eI-DRX cycle. The mobility of a UE may be predetermined (before the UE is placed into operation) or may be adjusted ad hoc. The mobility of a UE may be determined with respect to a particular base station or with respect to a likelihood that the UE 115 will move from a first base station to a second base station.

Figure 8:
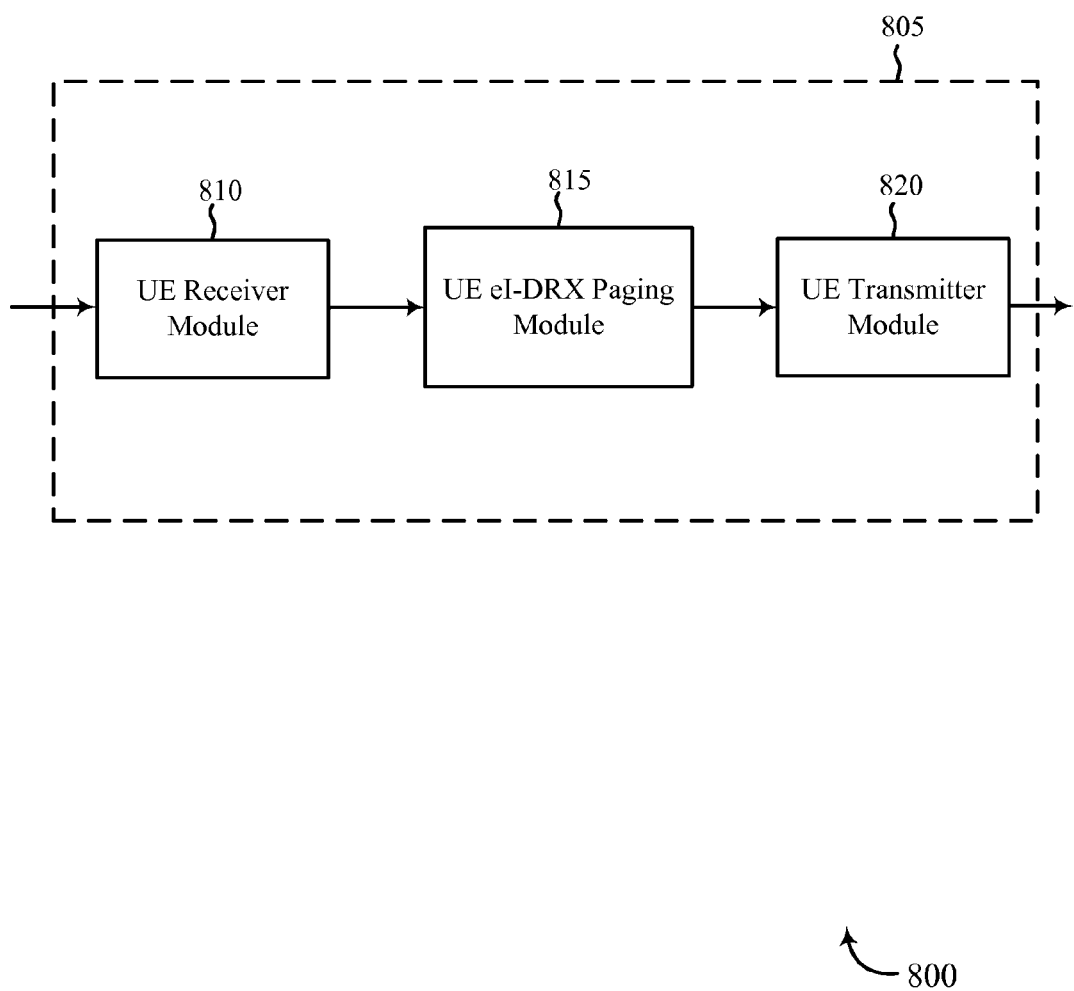
FIG. 8 shows a block diagram of a device configured for use in wireless communication, in accordance with various aspects of the present disclosure.

FIG. 8 shows a block diagram 800 of an apparatus 805 for use in wireless communication, in accordance with various aspects of the present disclosure. In some examples, the apparatus 805 may be referred to as a device and may be an example of devices described herein. The apparatus 805 may, for example, be an example of one or more aspects of a UE 115 described with reference to FIGS. 1, 2, 6, 7A and/or 7B. The apparatus 805 may include a UE receiver module 810, a UE eI-DRX paging module 815, and/or a UE transmitter module 820. The apparatus 805 may also be or include a processor (not shown). Each of these modules may be in communication with each other.

The components of the apparatus 805 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

The UE receiver module 810 may receive information such as packets, user data, and/or control information associated with various information channels (e.g., control channels, data channels, etc.). The UE receiver module 810 may be configured to receive, for example, an eI-DRX configuration from a base station. Information may be passed on to the UE eI-DRX paging module 815, and to other components of the apparatus 805.

The UE eI-DRX paging module 815 may receive an eI-DRX configuration from the UE receiver module 810 and may use the eI-DRX configuration in addition to mobility information for the apparatus 805 to determine when the apparatus 805 should make idle-mode measurements such as base station selection or re-selection measurements. In some examples, the UE-eI-DRX paging module may identify a change in a downlink channel reliability condition associated with the UE. The downlink channel reliability may include a mobility of the UE. The UE eI-DRX paging module 815 may determine the mobility of the apparatus 805 by accessing a predetermined mobility for the apparatus 805 (determined and programmed into the apparatus 805 before operation) or by determining the mobility ad hoc. Based on the change in a channel condition and the eI-DRX cycle, the UE eI-DRX paging module 815 may make operational adjustments, as explained with relation to FIGS. 6, 7A and 7B, in order to avoid missing a paging occasion in an eI-DRX cycle-defined paging frame.

The UE transmitter module 820 may transmit the one or more signals received from other components of the apparatus 805. The UE transmitter module 820 may be involved in communications between the apparatus 805 and a base station 105 or core network 130 (of FIG. 1) relating to establishing and adjusting an eI-DRX cycle. The UE transmitter module 820 may also be used by the apparatus 805 when the apparatus 805 establishes communications with different base stations as a result of the apparatus's mobility. In some examples, the UE transmitter module 820 may be collocated with the UE receiver module 810 in a transceiver module.

Figure 9:
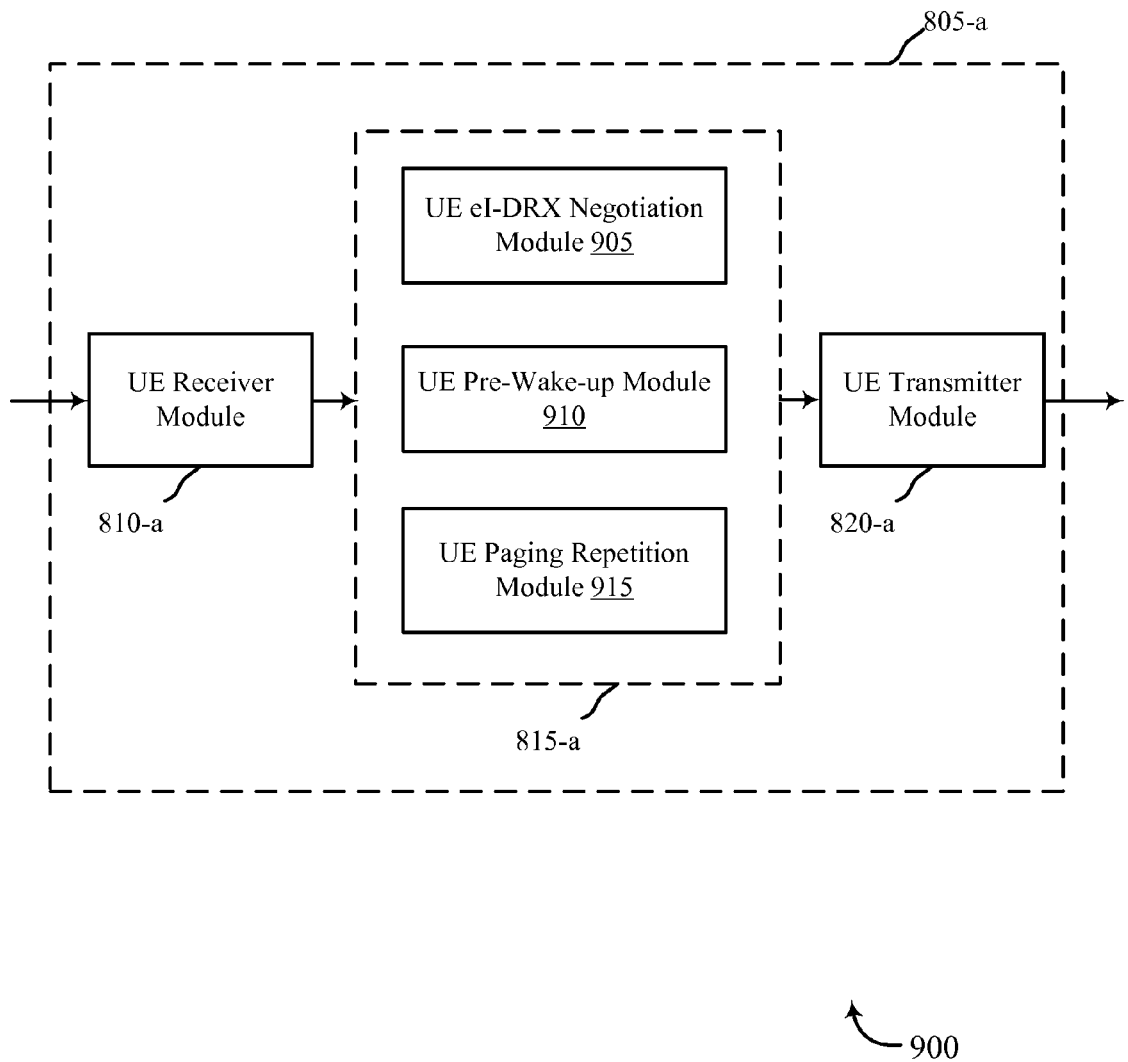
FIG. 9 shows a block diagram of a device configured for use in wireless communication, in accordance with various aspects of the present disclosure.

FIG. 9 shows a block diagram 900 of an apparatus 805-a for use in wireless communication, in accordance with various examples. In some examples, the apparatus 805-a may be referred to as a device and may be an example of devices described herein. The apparatus 805-a may, for instance, be an example of one or more aspects of a UE 115 described with reference to FIGS. 1, 2, 6, 7A and/or 7B. It may also be an example of the apparatus 805 described with reference to FIG. 8. The apparatus 805-a may include a UE receiver module 810-a, a UE eI-DRX paging module 815-a, and/or a UE transmitter module 820-*a*, which may be examples of the corresponding modules of apparatus 805. The apparatus 805-*a* may also include a processor (not shown). Each of these components may be in communication with each other. The UE eI-DRX paging module 815-*a* may include a UE eI-DRX negotiation module 905, a UE pre-wake-up module 910, and/or a UE paging repetition module 915. The UE receiver module 810-*a* and the UE transmitter module 820-*a* may perform the functions of the UE receiver module 810 and the UE transmitter module 820, of FIG. 8, respectively.

The UE eI-DRX negotiation module 905 may be used by the apparatus 805-*a* to negotiate an adjusted eI-DRX cycle. If the UE eI-DRX paging module 815-*a* determines that the mobility of the apparatus 805-*a* is likely to be high, then the UE eI-DRX negotiation module 905 may issue a request to either a base station or a core network to shorten its eI-DRX cycle. If the UE eI-DRX paging module 815-*a* determines that the mobility of the apparatus 805-*a* is likely to be low, then the UE eI-DRX negotiation module 905 may issue a request to lengthen its eI-DRX cycle. In some examples, the UE eI-DRX paging module 815-*a* may determine that there is a change in the downlink channel condition. For example, the UE eI-DRX paging module 815-*a* may determine that the downlink channel condition has become unreliable. For example, if a signal strength from a current serving base station is not strong enough to receive a PO that there is a likelihood of missing the PO, then the UE eI-DRX negotiation module 905 may send a request to either a base station or a core network to provide an adjusted eI-DRX cycle or additional page messages.

The UE pre-wake-up module 910 may be used by the apparatus 805-*a* to configure when the apparatus 805-*a* may perform idle-mode measurements such as base station selection or re-selection measurements. In particular, the UE pre-wake-up module 910 may establish a pre-wake-up interval during which the apparatus 805-*a* may awaken from an eI-DRX deep sleep and perform the base station selection or re-selection measurements. The pre-wake-up interval may be configured to occur during radio frames just before an eI-DRX paging frame. In this way, the apparatus 805-*a* is able to perform its idle-mode measurements before the paging frame occurs. Alternatively, the UE pre-wake-up module 910 may receive the pre-wake-up interval from either a base station or a core network. The pre-wake-up interval may be received as part of an SIB, for example.

The UE paging repetition module 915 may be used by the apparatus 805-*a* to negotiate a short paging cycle which may be used if the channel condition detected by the apparatus 805-*a* is unreliable. Using the UE receiver module 810-*a* and UE transmitter module 820-*a*, the UE paging repetition module 915 may communicate with a core network in order to negotiate the short paging cycle as well as a number of times the short paging cycle may be used after each missed paging occasion. If, after awaking from a deep sleep mode in an eI-DRX cycle, the UE paging repetition module 915 detects that a paging occasion was missed, the UE paging repetition module 915 may monitor legacy paging frames transmitted in accordance with the negotiated short paging cycle. The legacy paging frames may be monitored while the apparatus 805-*a* is in communication with an original base station or after the apparatus 805-*a* has transferred to a different base station.

The apparatus 805-*a* may use any and/or all of the modules 905, 910, 915 in UE eI-DRX paging module 815-*a* in order to reduce the likelihood that the apparatus 805-*a* misses a transmitted paging message.

Figure 10:
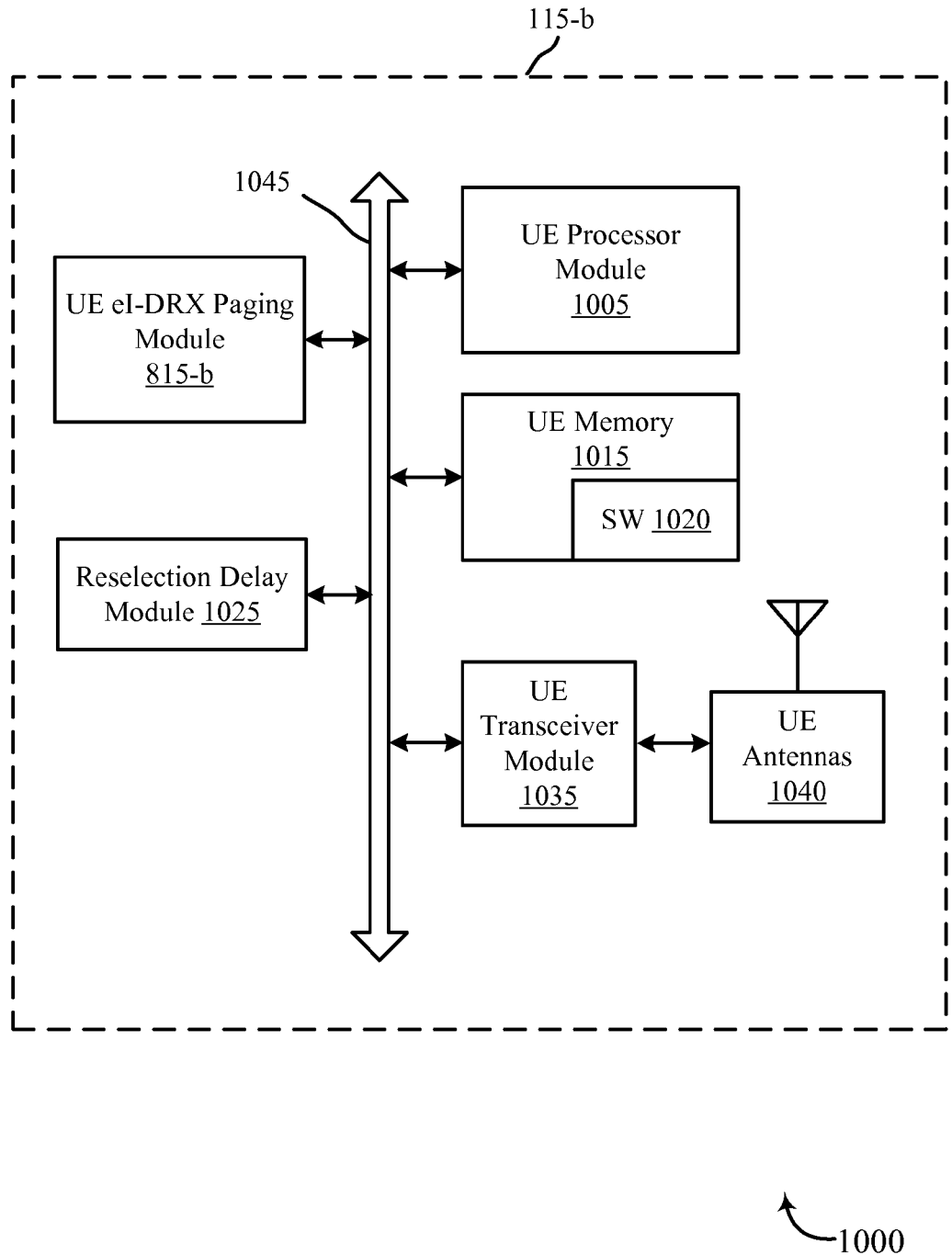
FIG. 10 shows a block diagram of a wireless communication system, in accordance with various aspects of the present disclosure.

FIG. 10 shows a system 1000 for use in wireless communication, in accordance with various examples. System 1000 may include a UE 115-*b*, which may be an example of the UEs 115 of FIGS. 1, 2, 6, 7A and/or 7B. UE 115-*b* may also be an example of one or more aspects of apparatus 805 of FIGS. 8 and 9.

The UE 115-*b* may generally include components for bi-directional voice and data communications including components for transmitting communications and components for receiving communications. The UE 115-*b* may include UE antenna(s) 1040, a UE transceiver module 1035, a UE processor module 1005, and UE memory 1015 (including software (SW) 1020), which each may communicate, directly or indirectly, with each other (e.g., via one or more buses 1045). The UE transceiver module 1035 may be configured to communicate bi-directionally, via the UE antenna(s) 1040 and/or one or more wired or wireless links, with one or more networks, as described above. For example, the UE transceiver module 1035 may be configured to communicate bi-directionally with base stations 105 with reference to FIG. 1. The UE transceiver module 1035 may include a modem configured to modulate packets and provide the modulated packets to the UE antenna(s) 1040 for transmission, and to demodulate packets received from the UE antenna(s) 1040. While the UE 115-*b* may include a single UE antenna, the UE 115-*b* may have multiple UE antennas capable of concurrently transmitting and/or receiving multiple wireless transmissions. The UE transceiver module 1035 may be capable of concurrently communicating with one or more base stations 105 via multiple component carriers.

The UE 115-*b* may include a UE eI-DRX paging module 815-*b*, which may perform the functions described above for the UE eI-DRX paging modules 815 of apparatus 805 of FIGS. 8 and 9. The UE 115-*b* may also include a reselection delay module 1025. The reselection delay module 1025 may be used in conjunction with the UE eI-DRX paging module 815-*b* to delay transition of the UE 115-*b* from a first base station to a second base station until the UE 115-*b* has at least performed a system access and participated in a paging occasion to ensure that no paging messages to the UE 115-*b* are missed. The reselection delay module 1025 may obtain or receive signal strength information resulting from idle-mode measurements of base stations. If the signal strength of an originally-connected base station is above a threshold (even if it is less than the signal strength of another base station), the reselection delay module 1025 may control the UE 115-*b* to delay transitioning to the stronger-signal base station until after the UE 115-*b* monitors a paging frame. Once the UE 115-*b* has monitored a paging frame, the reselection delay module 1025 may instruct the UE 115-*b* to transition to the new base station.

The UE memory 1015 may include random access memory (RAM) and read-only memory (ROM). The UE memory 1015 may store computer-readable, computer-executable software/firmware code 1020 containing instructions that are configured to, when executed, cause the UE processor module 1005 to perform various functions described herein (e.g., adjusting performance of idle-mode measurements and other parameters in order to avoid missing a paging occasion, etc.). Alternatively, the computer-readable, computer-executable software/firmware code 1020 may not be directly executable by the UE processor module 1005 but be configured to cause a computer (e.g., when compiled and executed) to perform functions described herein. The UE processor module 1005 may include an intelligent hardware device, e.g., a central processing unit (CPU), a microcontroller, an ASIC, etc. In some embodiments, the modules can be executed in a dedicated hardware (e.g., a circuit or circuitry) for performing the functions described herein.

Figure 11:
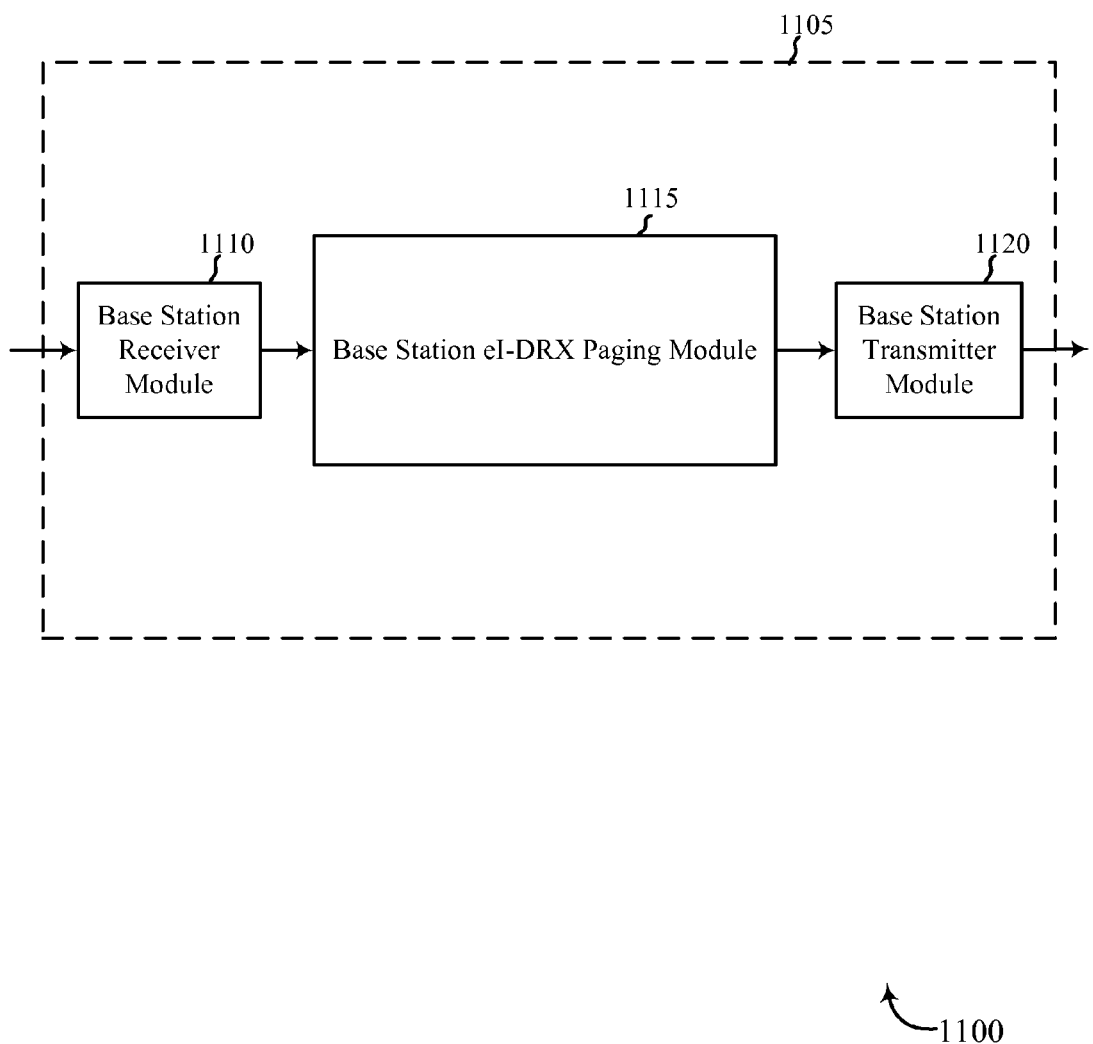
FIG. 11 shows a block diagram of an apparatus for use in wireless communication, in accordance with various aspects of the present disclosure.

FIG. 11 shows a block diagram 1100 of an apparatus 1105 for use in wireless communication, in accordance with various aspects of the present disclosure. In some examples, the apparatus 1105 may be referred to as a device and may be an example of devices described herein. For instance, the apparatus 1105 may be an example of aspects of one or more of the base stations 105 described with reference to FIGS. 1, 2, 6, 7A and/or 7B. In some examples, the apparatus 1105 may be part or include an LTE/LTE-A eNB and/or an LTE/LTE-A base station. The apparatus 1105 may also be a processor. The apparatus 1105 may include a base station receiver module 1110, a base station eI-DRX paging module 1115, and/or a base station transmitter module 1120. Each of these modules may be in communication with each other.

The components of the apparatus 1105 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors. In some embodiments, the modules can be executed in a dedicated hardware (e.g., a circuit or circuitry) for performing the functions described herein.

In some examples, the base station receiver module 1110 may include at least one radio frequency (RF) receiver, such as an RF receiver operable to receive communications from a UE 115 or a core network relating to eI-DRX configurations. The base station receiver module 1110 may be used to receive various types of data and/or control signals (i.e., transmissions) over one or more communication links of a wireless communication system, such as one or more communication links of the wireless communications system 100 described with reference to FIG. 1.

In some examples, the base station transmitter module 1120 may include at least one RF transmitter, such as at least one RF transmitter operable to transmit paging messages in accordance with an eI-DRX cycle. The base station transmitter module 1120 may be used to transmit various types of data and/or control signals (i.e., transmissions) over one or more communication links of a wireless communication system, such as one or more communication links of the wireless communications system 100 described with reference to FIG. 1.

In some examples, the base station eI-DRX paging module 1115 may be used to adjust how and when paging messages are transmitted from the apparatus 1105 to a UE 115. For example, the base station eI-DRX paging module 1115 may transmit paging messages to a UE 115 in accordance with a first eI-DRX cycle, a re-negotiated eI-DRX cycle, and based on requests from a UE 115 reflecting the UE's mobility, as explained above in relation to FIGS. 6, 7A and 7B, and as also explained below.

Figure 12:
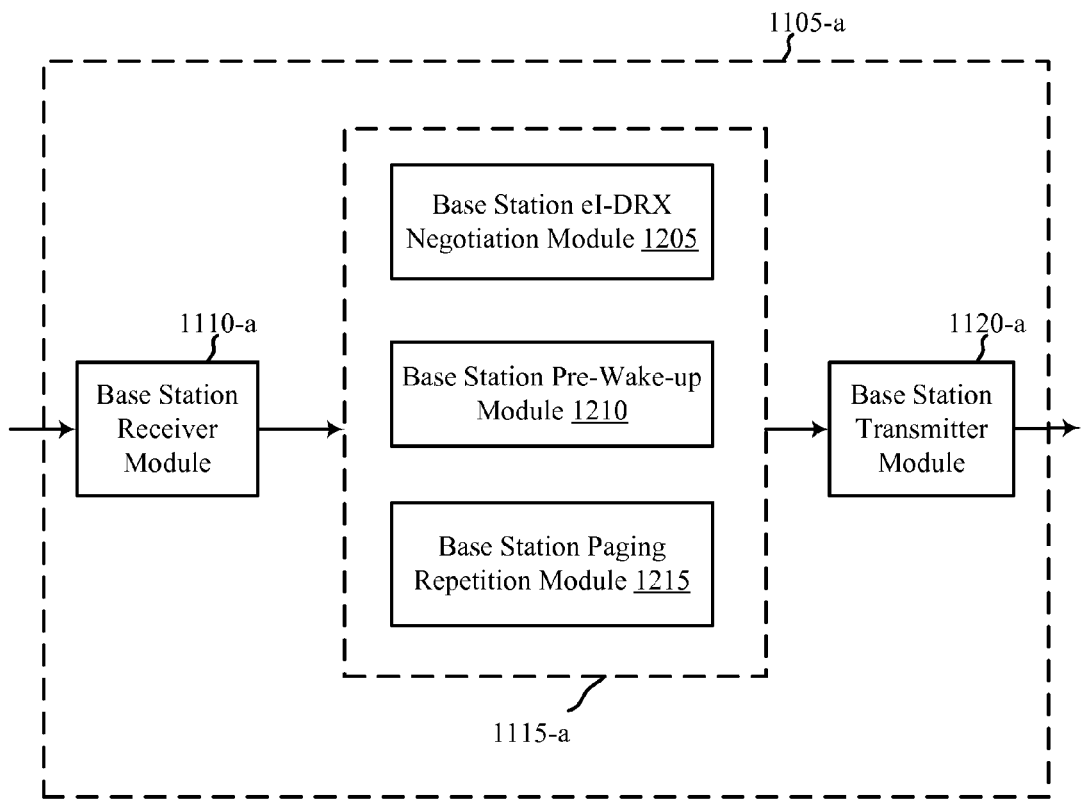
FIG. 12 shows a block diagram of an apparatus for use in wireless communication, in accordance with various aspects of the present disclosure.

FIG. 12 shows a block diagram 1200 of an apparatus 1105-a for use in wireless communication, in accordance with various aspects of the present disclosure. In some examples, the apparatus 1105-a may be referred to as a device and may be an example of devices described herein. For instance, the apparatus 1105-a may be an example of aspects of one or more of the base stations 105 described with reference to FIGS. 1, 2, 6, 7A and/or 7B, and/or an example of aspects of the apparatus 1105 described with reference to FIG. 11. In some examples, the apparatus 1105-a may be part or include an LTE/LTE-A eNB and/or an LTE/LTE-A base station. The apparatus 1105-a may also be a processor. The apparatus 1105-a may include a base station receiver module 1110-a, a base station eI-DRX paging module 1115-a, and/or a base station transmitter module 1120-a. Each of these modules may be in communication with each other.

The components of the apparatus 1105-a may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors. In some embodiments, the modules can be executed in a dedicated hardware (e.g., a circuit or circuitry) for performing the functions described herein.

In some examples, the base station receiver module 1110-a may be an example of one or more aspects of the base station receiver module 1110 described with reference to FIG. 11. In some examples, the base station transmitter module 1120-a may be an example of one or more aspects of the base station transmitter module 1120 described with reference to FIG. 11. The base station receiver module 1110-a and the base station transmitter module 1120-a may perform the functions of the base station receiver module 1110 and the base station transmitter module 1120, of FIG. 11, respectively.

The base station eI-DRX paging module 1115-a may include a base station eI-DRX negotiation module 1205, a base station pre-wake-up module 1210, and/or a base station paging repetition module 1215.

The base station eI-DRX negotiation module 1205 may be used by the apparatus 1105-a to negotiate an adjusted eI-DRX cycle with a UE. If a UE determines that the mobility of the UE is likely to be high, then the UE may transmit a request to the base station or a core network to shorten its eI-DRX cycle. The base station eI-DRX negotiation module 1205 may accordingly shorten the eI-DRX cycle, generally in response to an instruction or confirmation from the core network. If the UE determines that its mobility is likely to be low, then the UE may request a longer eI-DRX cycle. Once again, the base station eI-DRX negotiation module 1205 may respond by adjusting the eI-DRX cycle. In some examples, the UE may determine that there is a change in a downlink channel condition. The UE eI-DRX paging module 815-a, for instance, may determine that the downlink channel condition has become unreliable. For example, a signal strength from a current serving base station may not be strong enough to receive a PO so that there is a likelihood of missing the PO. The UE may thus request an adjusted eI-DRX cycle or additional page messages, and the base station eI-DRX negotiation module 1205, in connection with the base station paging repetition module 1215, may respond by adjusting the eI-DRX cycle or providing additional page messages.

The base station pre-wake-up module 1210 may be used by the apparatus 1105-a to transmit to a UE a pre-wake-up interval for use by the UE in an eI-DRX cycle. The base station pre-wake-up module 1210 may broadcast the pre-wake-up interval, and information pertaining to the same, via an SIB, for example.

The base station paging repetition module 1215 may be used by the apparatus 1105-a to negotiate a short paging cycle which may be used if a UE misses a paging occasion. The base station paging repetition module 1215 may negotiate a short paging configuration with a UE, or may, alternatively, receive a short paging configuration from a core network. If the base station paging repetition module 1215 detects that a UE has missed a paging occasion (e.g., the UE has not received a transmitted paging message), the base station paging repetition module 1215 may instruct the apparatus 1105-a to continue to transmit the missed paging message in accordance with the negotiated short paging cycle. Alternatively, the base station paging repetition module 1215 may simply send multiple instances of each paging messages to the UE, regardless of whether the UE missed a paging occasion. In either instance, the base station paging repetition module 1215 may send the paging messages in accordance with the short paging cycle. The base station paging repetition module 1215 may continue to send the paging messages until either the paging messages are sent a maximum number of instances, the UE notifies the apparatus 1105-a that the UE has received a paging message, or the core network notifies the apparatus 1105-a that the UE has received a paging message. The base station paging repetition module 1215 may also ensure that paging messages sent in accordance with the short paging cycle are also sent in a synchronized or nearly synchronized hyper-SFN with other base stations within an MME tracking area. In this way, a group of base stations within the MME tracking area may each transmit paging messages simultaneously or nearly so, thus enabling a UE to more easily transition from different base stations without missing a paging message.

Figure 13:
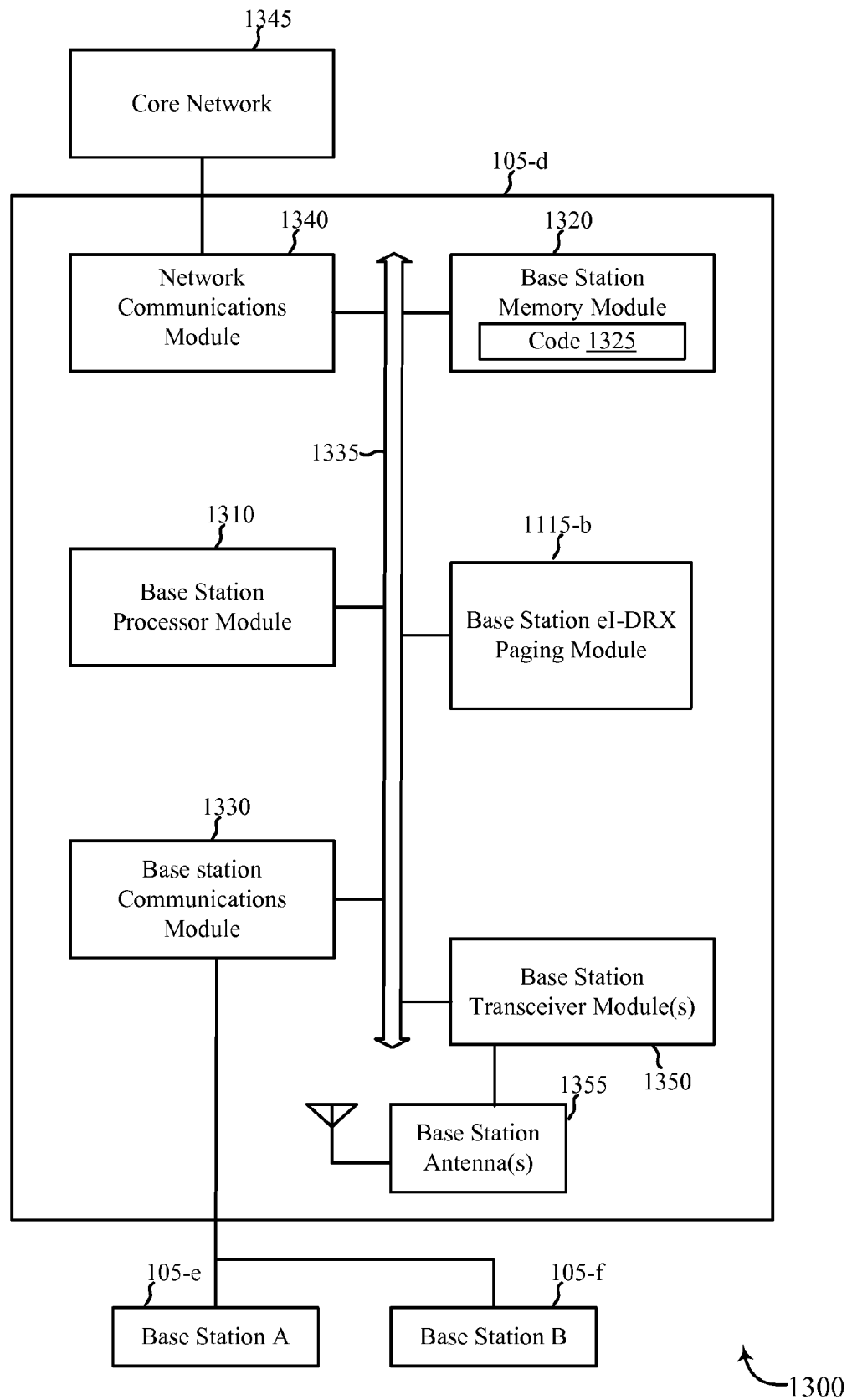
FIG. 13 shows a block diagram of a base station (e.g., a base station forming part or all of an eNB) for use in wireless communication, in accordance with various aspects of the present disclosure.

FIG. 13 shows a block diagram 1300 of a base station 105-d (e.g., a base station forming part or all of an eNB) for use in wireless communication, in accordance with various aspects of the present disclosure. In some examples, the base station 105-d may be an example of aspects of one or more of the base stations 105 described with reference to FIGS. 1, 2, 6, 7A and/or 7B, and/or aspects of one or more of the apparatus 1105 when configured as a base station, as described with reference to FIGS. 11 and/or 12. The base station 105-d may be configured to implement or facilitate at least some of the base station and/or apparatus features and functions described with reference to FIGS. 1, 2, 6, 7A, 7B, 11 and/or 12.

The base station 105-d may include a base station processor module 1310, a base station memory module 1320, at least one base station transceiver module (represented by base station transceiver module(s) 1350), at least one base station antenna (represented by base station antenna(s) 1355), and/or a base station eI-DRX paging module 1115-b. The base station 105-d may also include one or more of a base station communications module 1330 and/or a network communications module 1340. Each of these modules may be in communication with each other, directly or indirectly, over one or more buses 1335.

The base station memory module 1320 may include RAM and/or ROM. The base station memory module 1320 may store computer-readable, computer-executable software/firmware code 1325 containing instructions that are configured to, when executed, cause the base station processor module 1310 to perform various functions described herein related to wireless communication (e.g., adjustment of paging operations in accordance with eI-DRX cycles, etc.). Alternatively, the computer-readable, computer-executable software/firmware code 1325 may not be directly executable by the base station processor module 1310 but be configured to cause the base station 1305 (e.g., when compiled and executed) to perform various of the functions described herein. In some embodiments, the modules can be executed in a dedicated hardware (e.g., a circuit or circuitry) for performing the functions described herein.

The base station processor module 1310 may include an intelligent hardware device, e.g., a CPU, a microcontroller, an ASIC, etc. The base station processor module 1310 may process information received through the base station transceiver module(s) 1350, the base station communications module 1330, and/or the network communications module 1340. The base station processor module 1310 may also process information to be sent to the base station transceiver module(s) 1350 for transmission through the base station antenna(s) 1355, to the base station communications module 1330, for transmission to one or more other base stations 105-e and 105-f, and/or to the network communications module 1340 for transmission to a core network 1345, which may be an example of one or more aspects of the core network 130 described with reference to FIG. 1. The base station processor module 1310 may handle, alone or in connection with the base station eI-DRX paging module 1115-b, various aspects of eI-DRX-related paging operations.

The base station transceiver module(s) 1350 may include a modem configured to modulate packets and provide the modulated packets to the base station antenna(s) 1355 for transmission, and to demodulate packets received from the base station antenna(s) 1355. The base station transceiver module(s) 1350 may, in some examples, be implemented as one or more base station transmitter modules and one or more separate base station receiver modules. The base station transceiver module(s) 1350 may support communications in a first radio frequency spectrum band and/or a second radio frequency spectrum band. The base station transceiver module(s) 1350 may be configured to communicate bi-directionally, via the base station antenna(s) 1355, with one or more UEs or apparatuses, such as one or more of the UEs 115 described with reference to FIGS. 1, 2, 6, 7A, 7B and/or 10. The base station 105-d may, for example, include multiple base station antennas 1355 (e.g., an antenna array). The base station 105-d may communicate with the core network 1345 through the network communications module 1340. The base station 105-d may also communicate with other base stations, such as the base stations 105-e and 105-f, using the base station communications module 1330.

The base station eI-DRX paging module 1115-b may be configured to perform and/or control some or all of the features and/or functions described with reference to FIGS. 6, 7A and/or 7B related to adjusting paging operations in accordance with eI-DRX cycles. In some examples, the base station eI-DRX paging module 1115-b may be used to transmit a new eI-DRX cycle to a UE. In other examples, the base station eI-DRX paging module 1115-b may be used to transmit a pre-wake-up interval to a UE. In still other examples, the base station eI-DRX paging module 1115-b may be used to negotiate a shortened paging cycle to be used based at least in part on a reliability of radio link between the base station and the UE. The reliability may be based on a coverage requirements, a change of a UE mobility, and/or a radio channel condition. The base station eI-DRX paging module 1115-*b*, or portions of the base station eI-DRX paging module 1115-*b*, may include a processor, and/or some or all of the functions of the base station eI-DRX paging module 1115-*b* may be performed by the base station processor module 1310 and/or in connection with the base station processor module 1310. In some examples, the base station eI-DRX paging module 1115-*b* may be an example of the base station eI-DRX paging module 1115 and/or 1115-*a* described with reference to FIGS. 11 and/or 12.

Figure 14:
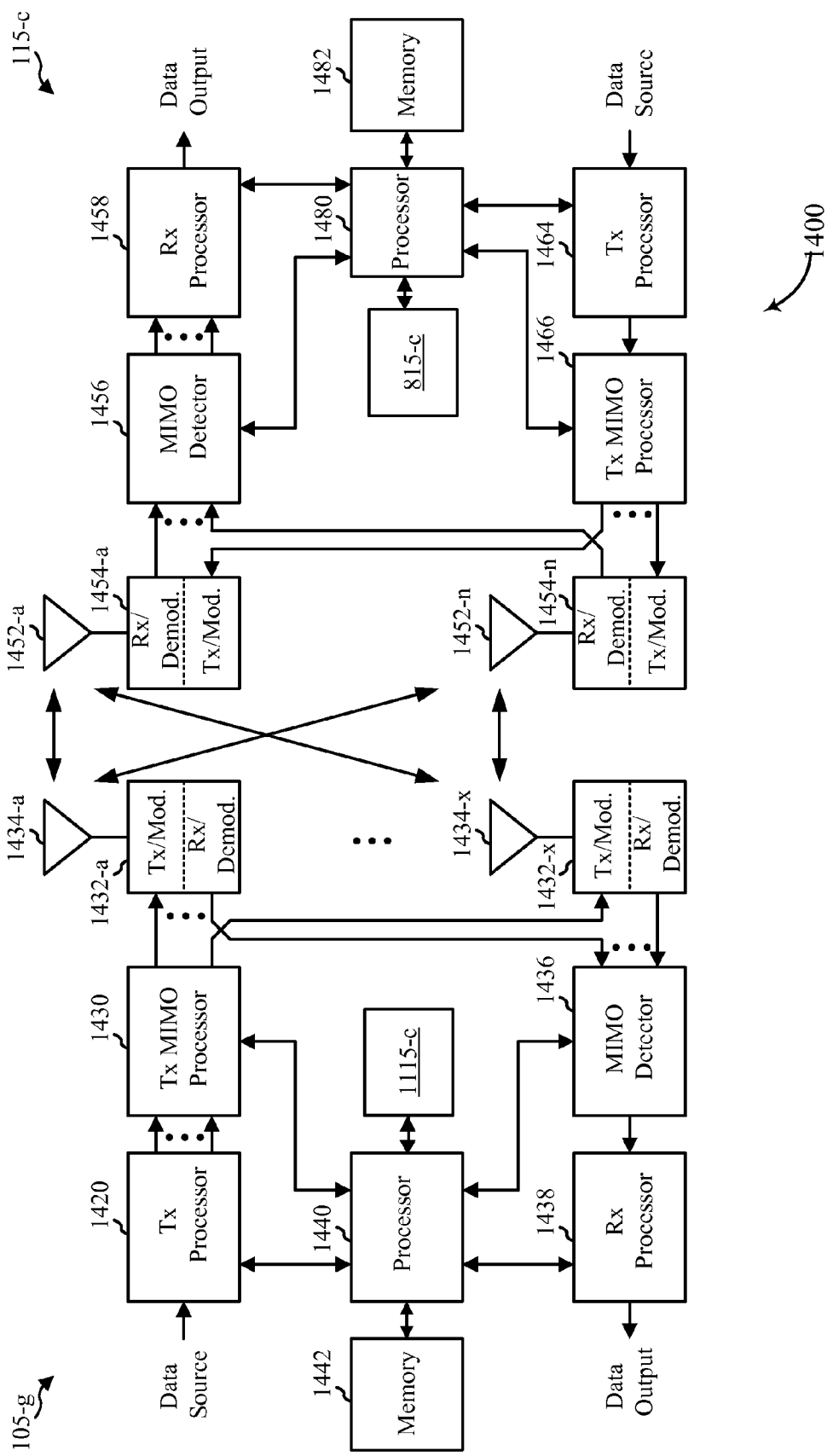
FIG. 14 shows a block diagram of a multiple-input/multiple-output communication system, in accordance with various aspects of the present disclosure.

FIG. 14 is a block diagram of a MIMO communication system 1400 including a base station 105-*g* and a UE 115-*c*. The MIMO communication system 1400 may illustrate aspects of the wireless communications system 100 shown in FIG. 1. The base station 105-*g* may be equipped with antennas 1434-*a* through 1434-*x*, and the UE 115-*c* may be equipped with antennas 1452-*a* through 1452-*n*. In the MIMO communication system 1400, the base station 105-*g* may be able to send data over multiple communication links at the same time. Each communication link may be called a "layer" and the "rank" of the communication link may indicate the number of layers used for communication. For example, in a 2×2 MIMO communications system where base station 105-*g* transmits two "layers," the rank of the communication link between the base station 105-*g* and the UE 115-*c* is two.

At the base station 105-*g*, a transmit (Tx) processor 1420 may receive data from a data source. The transmit processor 1420 may process the data. The transmit processor 1420 may also generate control symbols and/or reference symbols. A transmit (TX) MIMO processor 1430 may perform spatial processing (e.g., precoding) on data symbols, control symbols, and/or reference symbols, if applicable, and may provide output symbol streams to the transmit modulators 1432-*a* through 1432-*x*. Each modulator 1432 may process a respective output symbol stream (e.g., for OFDM, etc.) to obtain an output sample stream. Each modulator 1432 may further process (e.g., convert to analog, amplify, filter, and upconvert) the output sample stream to obtain a DL signal. In one example, DL signals from modulators 1432-*a* through 1432-*x* may be transmitted via the antennas 1434-*a* through 1434-*x*, respectively.

At the UE 115-*c*, the UE antennas 1452-*a* through 1452-*n* may receive the DL signals from the base station 105-*g* and may provide the received signals to the demodulators 1454-*a* through 1454-*n*, respectively. Each demodulator 1454 may condition (e.g., filter, amplify, downconvert, and digitize) a respective received signal to obtain input samples. Each demodulator 1454 may further process the input samples (e.g., for OFDM, etc.) to obtain received symbols. A MIMO detector 1456 may obtain received symbols from all the demodulators 1454-*a* through 1454-*n*, perform MIMO detection on the received symbols, if applicable, and provide detected symbols. A receive (Rx) processor 1458 may process (e.g., demodulate, deinterleave, and decode) the detected symbols, providing decoded data for the UE 115-*c* to a data output, and provide decoded control information to a processor 1480, or memory 1482.

The processor 1480 may in some cases execute stored instructions to instantiate one or more of a UE eI-DRX paging module 815-*c*. The UE eI-DRX paging module 815-*c* may be an example of aspects of the UE eI-DRX paging module 815 described with reference to FIGS. 8, 9 and/or 10.

On the uplink (UL), at the UE 115-*c*, a transmit processor 1464 may receive and process data from a data source. The transmit processor 1464 may also generate reference symbols for a reference signal. The symbols from the transmit processor 1464 may be precoded by a transmit MIMO processor 1466 if applicable, further processed by the demodulators 1454-*a* through 1454-*n* (e.g., for SC-FDMA, etc.), and be transmitted to the base station 105-*g* in accordance with the transmission parameters received from the base station 105-*g*. At the base station 105-*g*, the UL signals from the UE 115-*c* may be received by the antennas 1434, processed by the demodulators 1432, detected by a MIMO detector 1436 if applicable, and further processed by a receive processor 1438. The receive processor 1438 may provide decoded data to a data output and to the processor 1440 and/or memory 1442. The processor 1440 may in some cases execute stored instructions to instantiate one or more of a base station eI-DRX paging module 1115-*c*. The base station eI-DRX paging module 1115-*c* may be an example of aspects of the base station eI-DRX paging module 1115 described with reference to FIGS. 11, 12 and/or 13.

The components of the UE 115-*c* may, individually or collectively, be implemented with one or more ASICs adapted to perform some or all of the applicable functions in hardware. Each of the noted modules may be a means for performing one or more functions related to operation of the MIMO communication system 1400. Similarly, the components of the base station 105-*g* may, individually or collectively, be implemented with one or more ASICs adapted to perform some or all of the applicable functions in hardware. Each of the noted components may be a means for performing one or more functions related to operation of the MIMO communication system 1400.

Figure 15:
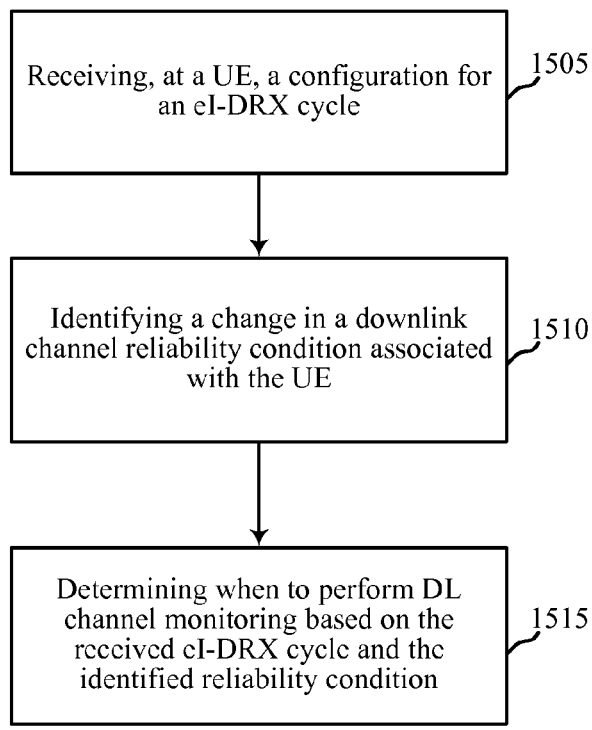
FIGS. 15-18 are flow charts illustrating examples of methods for wireless communication, in accordance with various aspects of the present disclosure.

FIG. 15 is a flow chart illustrating an example of a method 1500 for wireless communication, in accordance with various aspects of the present disclosure. For clarity, the method 1500 is described below with reference to aspects of one or more of the UEs 115 described with reference to FIGS. 1, 2, 6, 7A, 7B, 10 and/or 14, and/or aspects of one or more of the apparatus 805 described with reference to FIGS. 8 and/or 9. In some examples, a UE may execute one or more sets of codes to control the functional elements of the UE to perform the functions described below. Additionally or alternatively, the UE may perform one or more of the functions described below using special-purpose hardware.

At block 1505, the method 1500 may include receiving, at a UE, a configuration for an eI-DRX cycle. The received eI-DRX cycle may include a designated paging frame for which the UE may awaken in order to perform a system access to retrieve any transmitted paging messages. The UE may also need to perform idle-mode measurements such as base station selection or re-selection measurements prior to participating in the paging occasion. The operation(s) at block 1505 may be performed using the UE eI-DRX paging module 815 described with reference to FIGS. 8, 9 and/or 10.

At block 1510, the method 1500 may include identifying a change in a downlink channel reliability condition associated with the UE. The change in the downlink channel reliability condition may be identified based on coverage requirements, a change of a UE mobility, or a radio channel condition. In some examples, identifying the change in the downlink channel reliability condition may include determining a mobility of the UE. The UE may determine that it is likely to have a high mobility and thus may benefit from a shorter eI-DRX cycle. Alternatively, the UE may determine that it is likely to have a low mobility and thus may benefit from a longer eI-DRX cycle. In some examples, identifying the change in the downlink channel reliability condition may include identifying a radio channel condition detected by the UE. For instance, the UE may measure a signal strength of a serving base station in its coverage area is not strong enough to receive paging occasions. In yet another embodiment, the UE may determine that it has already moved from the geographic coverage area of one base station to the geographic coverage area of another base station, the UE may need to adjust how and when it performs idle-mode measurements or participates in paging occasions. The operation(s) at block 1510 may be performed using the UE eI-DRX paging module 815 described with reference to FIGS. 8, 9 and/or 10.

At block 1515, the method 1500 may include determining when to perform DL channel monitoring based on the received eI-DRX cycle and the identified reliability condition. Using the information obtained at blocks 1505 and 1510, the method 1500 then determines when to perform paging message monitoring. The operation(s) at block 1515 may be performed using the UE eI-DRX paging module 815 described with reference to FIGS. 8, 9 and/or 10.

Thus, the method 1500 may provide for wireless communication and, in particular, wireless communication using eI-DRX cycles. It should be noted that the method 1500 is just one implementation and that the operations of the method 1500 may be rearranged or otherwise modified such that other implementations are possible.

Figure 16:
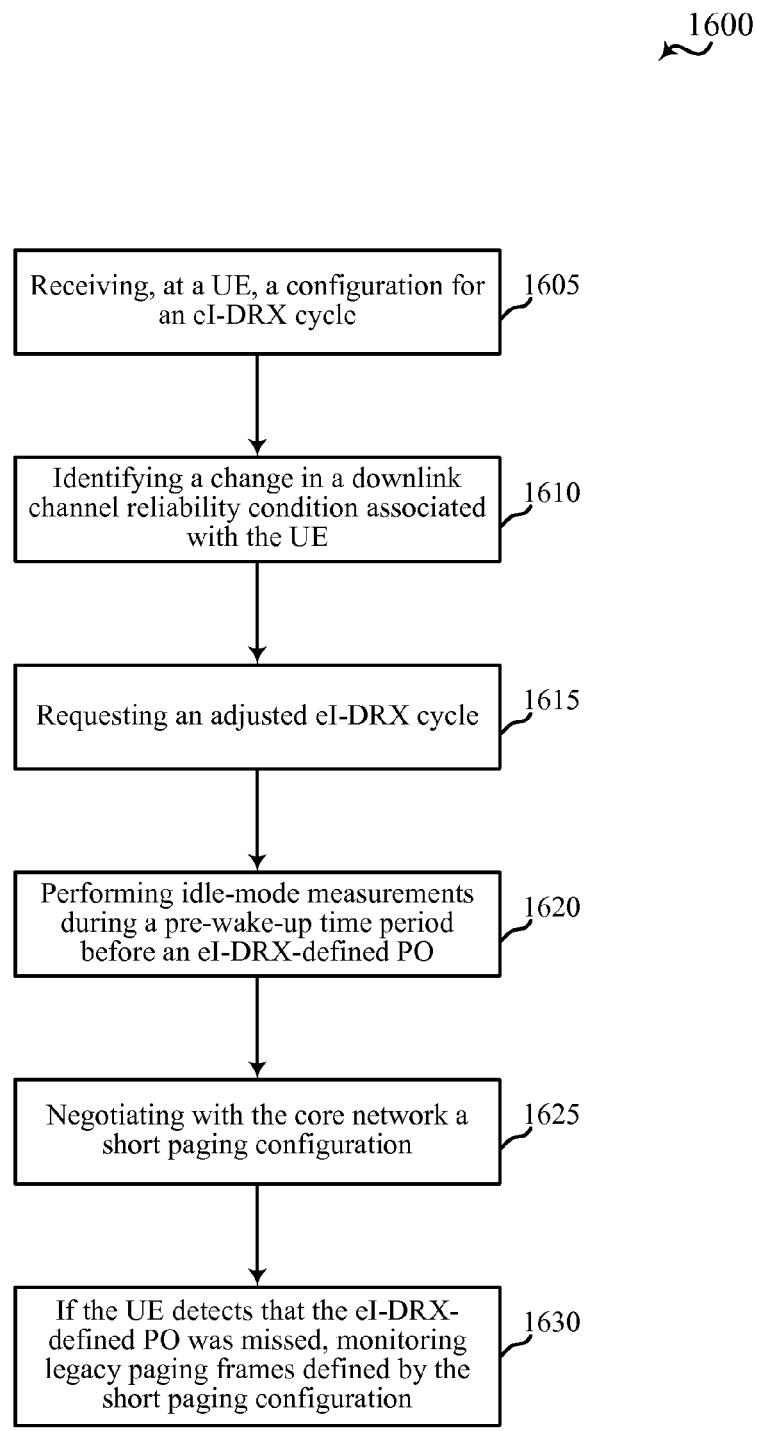

FIG. 16 is a flow chart illustrating an example of a method 1600 for wireless communication, in accordance with various aspects of the present disclosure. For clarity, the method 1600 is described below with reference to aspects of one or more of the UEs 115 described with reference to FIGS. 1, 2, 6, 7A, 7B, 10 and/or 14, and/or aspects of one or more of the apparatus 805 described with reference to FIGS. 8 and/or 9. In some examples, a UE may execute one or more sets of codes to control the functional elements of the UE to perform the functions described below. Additionally or alternatively, the UE may perform one or more of the functions described below using special-purpose hardware.

At block 1605, the method 1600 may include receiving, at a UE, a configuration for an eI-DRX cycle. The received eI-DRX cycle may include a designated paging frame for which the UE may awaken in order to perform a system access to retrieve any transmitted paging messages. The UE may also need to perform idle-mode measurements such as base station selection or re-selection measurements prior to participating in the paging occasion.

At block 1610, the method 1600 may include Identifying a change in a downlink channel reliability condition associated with the UE. The UE may identify that there is a change in a radio condition and/or a mobility of the UE. For example, the UE may determine that it is likely to have a high mobility and thus may benefit from a shorter eI-DRX cycle. Alternatively, the UE may determine that it is likely to have a low mobility and thus may benefit from a longer eI-DRX cycle. In yet another embodiment, the UE may determine that it has already moved from the geographic coverage area of one base station to the geographic coverage area of another base station, and thus, based on the change of the UE, the UE may need to adjust how and when it performs idle-mode measurements or participates in paging occasions.

At block 1615, the method 1600 may include requesting an adjusted eI-DRX cycle. If the UE's mobility is determined to be high, the UE may request that its eI-DRX cycle be shortened, for example.

At block 1620, the method 1600 may include performing idle-mode measurements during a pre-wake-up time period before an eI-DRX-defined paging occasion. In order to avoid missing a paging occasion, the UE may be configured to perform idle-mode measurements such as base station selection or re-selection measurements during a time interval that is before a paging frame in an eI-DRX cycle. The pre-wake-up time period may also be received by the UE in an SIB, for example.

At block 1625, the method 1600 may include negotiating with the core network a short paging configuration. In order to ensure that paging messages are not missed, the UE may negotiate with the core network to establish when and for what duration a short paging cycle may be used when it is detected that the UE has missed a paging occasion. Thus, at block 1630, the method also includes monitoring legacy paging frames defined by the short paging configuration if the UE detects that it has missed an eI-DRX-defined paging occasion.

While a UE may implement each of the steps of method 1600, method 1600 is merely an example; The steps of method 1600 need not be implemented in the exact order described. Neither must a UE implement all of the steps of method 1600. Thus, it should be noted that the method 1600 is just one implementation and that the operations of the method 1600 may be rearranged or otherwise modified such that other implementations are possible.

Figure 17:
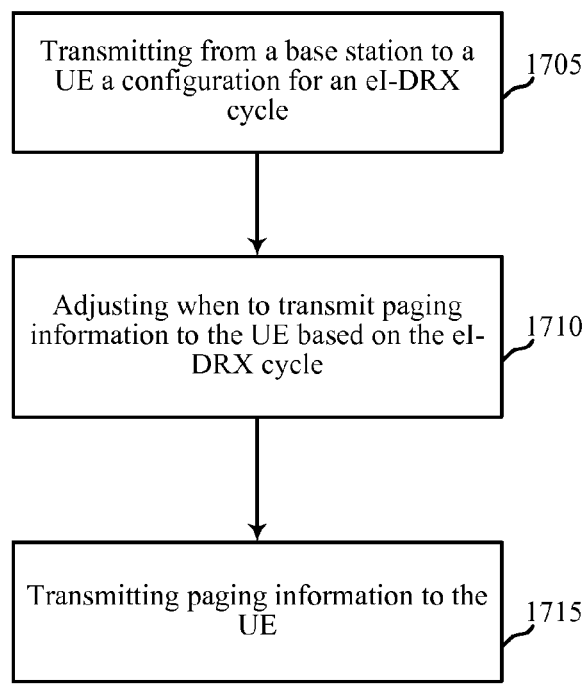

FIG. 17 is a flow chart illustrating an example of a method 1700 for wireless communication, in accordance with various aspects of the present disclosure. For clarity, the method 1700 is described below with reference to aspects of one or more of the base stations 105 described with reference to FIGS. 1, 2, 6, 7A, 7B, 13 and/or 14, and/or aspects of one or more of the apparatus 1105 described with reference to FIGS. 11 and/or 12. In some examples, a base station may execute one or more sets of codes to control the functional elements of the base station to perform the functions described below. Additionally or alternatively, the base station may perform one or more of the functions described below using special-purpose hardware.

At block 1705, the method 1700 may include transmitting from a base station to a UE a configuration for an eI-DRX cycle. The transmitted eI-DRX cycle may include a designated paging frame for which the UE may awaken in order to perform a system access to retrieve any transmitted paging messages. The operation(s) at block 1705 may be performed using the base station eI-DRX paging module 1115 described with reference to FIGS. 11, 12 and/or 13.

At block 1710, the method 1700 may include adjusting when to transmit paging information to the UE based on the eI-DRX cycle. The adjustment may be based at least in part on a change in a downlink channel reliability condition detected by the UE. For example, the base station may receive a request from the UE to change the eI-DRX cycle based on a change in a downlink channel reliability condition or the UE's mobility. In response, the base station may adjust the transmission of paging information in accordance with an updated eI-DRX cycle. Alternatively, the UE may request that the base station re-transmit paging messages if the UE misses a paging occasion due to the change of the channel reliability or its mobility. In response, the base station may transmit paging messages in accordance with a short paging cycle after an eI-DRX paging frame. The operation(s) at block 1710 may be performed using the base station eI-DRX paging module 1115 described with reference to FIGS. 11, 12 and/or 13.

At block 1715, the method 1700 may include transmitting the paging information to the UE. The paging information is transmitted in accordance to the adjustments made in block 1710. The operation(s) at block 1715 may be performed using the base station eI-DRX paging module 1115 described with reference to FIGS. 11, 12 and/or 13.

Thus, the method 1700 may provide for wireless communication and, in particular, wireless communication using eI-DRX cycles. It should be noted that the method 1700 is just one implementation and that the operations of the method 1700 may be rearranged or otherwise modified such that other implementations are possible.

Figure 18:
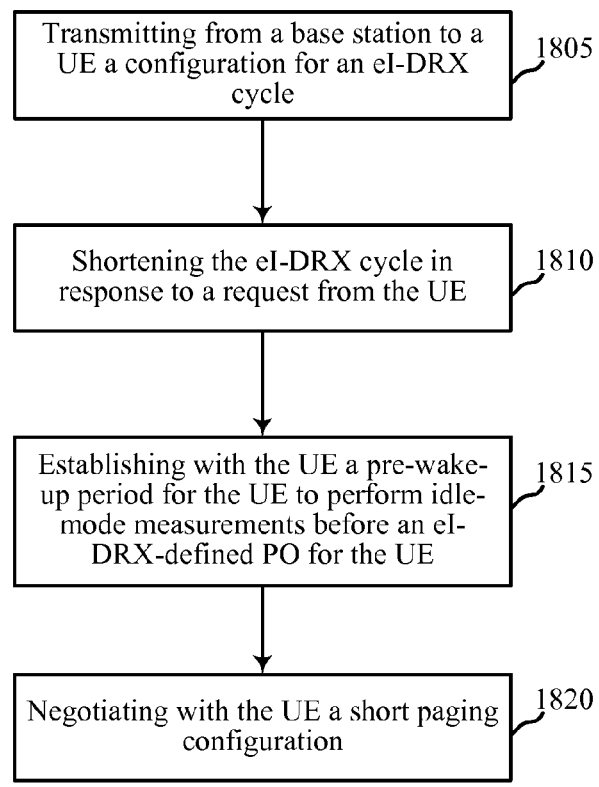

FIG. 18 is a flow chart illustrating an example of a method 1800 for wireless communication, in accordance with various aspects of the present disclosure. For clarity, the method 1800 is described below with reference to aspects of one or more of the base stations 105 described with reference to FIGS. 1, 2, 6, 7A, 7B, 13 and/or 14, and/or aspects of one or more of the apparatuses 1105 described with reference to FIGS. 11 and/or 12. In some examples, a base station may execute one or more sets of codes to control the functional elements of the base station to perform the functions described below. Additionally or alternatively, the base station may perform one or more of the functions described below using special-purpose hardware.

At block 1805, the method 1800 may include transmitting from a base station to a UE a configuration for an eI-DRX cycle. The transmitted eI-DRX cycle may include a designated paging frame for which the UE may awaken in order to perform a system access to retrieve any transmitted paging messages.

At block 1810, the method 1800 may include shortening the eI-DRX cycle in response to a request from the UE. The UE may determine that, due to its mobility, it would benefit from a shorter eI-DRX cycle having more frequent paging frames.

At block 1815, the method 1800 may include establishing with the UE a pre-wake-up period for the UE to perform idle-mode measurements before an eI-DRX-defined paging occasion for the UE. The base station may do this by, for example, broadcasting a pre-wake-up interval as part of an SIB.

At block 1820, the method 1800 may include negotiating with the UE a short paging configuration. The base station may perform the negotiations, or the negotiations may be performed by the core network and then communicated to the base station. In either case, the base station agrees to transmit paging messages to a UE in accordance with a short paging cycle if the UE misses a paging occasion. The base station may continue to transmit the paging messages until either a maximum number of transmission is reached (as may be predefined for the base station), the UE notifies the base station that it has received a paging message, or the core network notifies the base station that the UE has received the paging message.

It should be noted that the method 1800 is just one implementation and that the operations of the method 1800 may be rearranged or otherwise modified such that other implementations are possible.

In some examples, aspects from two or more of the methods 1500, 1600, 1700, 1800 may be combined. It should be noted that the methods 1500, 1600, 1700, 1800 are just example implementations, and that the operations of the methods 1500-1800 may be rearranged or otherwise modified such that other implementations are possible.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1λ, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), flash memory, compact disk (CD)-ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a non-transitory computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of non-transitory computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for extended idle-mode discontinuous reception (eI-DRX) operation in a wireless communication system, comprising:
    establishing, at a user equipment (UE), a short paging configuration comprising at least one paging occasion of a short paging cycle;
    establishing, at the UE, an eI-DRX configuration comprising an eI-DRX cycle and a plurality of eI-DRX paging opportunities, the eI-DRX cycle comprising a plurality of the short paging cycles; and
    monitoring a downlink channel based on the eI-DRX configuration and the short paging configuration, wherein the monitoring comprises monitoring, for each eI-DRX cycle, the downlink channel according to the short paging cycle for the plurality of eI-DRX paging opportunities.

2. The method of claim 1, further comprising:
    identifying a change in the downlink channel reliability condition associated with the UE, wherein the identifying the change in the downlink channel reliability condition comprises determining a mobility of the UE with respect to a first base station coverage area.

3. The method of claim 2, wherein determining the mobility of the UE comprises:
    determining a UE mobility value that indicates that the UE will move to a second base station coverage area during the established eI-DRX cycle.

4. The method of claim 3, further comprising:
    requesting an adjusted eI-DRX cycle based on the determined UE mobility value.

5. The method of claim 2, wherein identifying the change in the downlink channel reliability condition associated with the UE comprises:
    performing idle-mode measurements based on the eI-DRX cycle, the idle-mode measurements including measuring a signal strength of at least one of the first base station having the first base station coverage area or a second base station having a second base station coverage area,
    wherein the monitoring the downlink channel is based on the idle-mode measurements.

6. The method of claim 5, wherein performing the idle-mode measurements comprises:
    performing the idle-mode measurements during a pre-wake-up time period before an eI-DRX-defined paging occasion (PO), wherein the pre-wake-up time period is a function of the eI-DRX cycle.

7. The method of claim 6, further comprising:
    maintaining a connection with the first base station for a duration of the eI-DRX-defined PO when the signal strength of the first base station is less than the signal strength of the second base station and above a predefined minimum signal strength threshold; and
    establishing a connection with the second base station after the eI-DRX-defined PO.

8. The method of claim 6, further comprising:
    establishing a connection with the second base station before the eI-DRX-defined PO when the signal strength of the first base station is less than the signal strength of the second base station and less than a predefined minimum signal strength threshold; and
    participating in the eI-DRX-defined PO with the second base station.

9. The method of claim 6, further comprising:
    receiving the pre-wake-up time period as part of a system information block (SIB).

10. The method of claim 2, further comprising:
establishing the short paging configuration based at least in part on the change in the downlink channel reliability condition.

11. The method of claim 10, wherein establishing the short paging configuration comprises:
establishing a maximum number of monitoring instances for which the short paging cycle is to be used when there is a change in the downlink channel reliability condition.

12. The method of claim 11, further comprising:
performing downlink channel monitoring based on the short paging cycle and the maximum number of monitoring instances when the UE determines the change in the downlink channel reliability condition.

13. The method of claim 1, wherein the short paging cycle is configured according to a system frame number (SFN) and the eI-DRX cycle is configured according to a hyper-SFN that extends the SFN.

14. The method of claim 1, wherein the plurality of eI-DRX paging opportunities are configured to be within a subset of the plurality of the short paging cycles of the eI-DRX cycle according to the eI-DRX configuration.

15. An apparatus for extended idle-mode discontinuous reception (eI-DRX) operation in a wireless communication system, comprising:
a processor;
memory in electronic communication with the processor; and
instructions stored in the memory and operable, when executed by the processor, to cause the apparatus to:
establish, at a user equipment (UE), a short paging configuration comprising at least one paging occasion of a short paging cycle;
establish, at the UE, an eI-DRX configuration comprising an eI-DRX cycle and a plurality of eI-DRX paging opportunities, the eI-DRX cycle comprising a plurality of the short paging cycle; and
monitor a downlink channel based on the eI-DRX configuration and the short paging configuration, wherein the monitoring comprises monitoring, for each eI-DRX cycle, the downlink channel according to the short paging cycle for the plurality of eI-DRX paging opportunities.

16. The apparatus of claim 15, further comprising instructions executable by the processor to:
identify a change in the downlink channel reliability condition associated with the UE, wherein the instructions executable by the processor to identify the change in the downlink channel reliability condition comprising instructions executable by the processor to determine a mobility of the UE with respect to a first base station coverage area.

17. The apparatus of claim 16, the instructions executable by the processor to determine the mobility of the UE comprising instructions executable by the processor to:
determine a UE mobility value that indicates that the UE will move to a second base station coverage area during the established eI-DRX cycle.

18. The apparatus of claim 17, further comprising instructions executable by the processor to:
request an adjusted eI-DRX cycle based on the determined UE mobility value.

19. The apparatus of claim 16, the instructions executable by the processor to identify the change in the downlink channel reliability condition associated with the UE comprising instructions executable by the processor to:
perform idle-mode measurements based on the eI-DRX cycle, the idle-mode measurements including measuring a signal strength of at least one of a first base station having the first base station coverage area or a second base station having a second base station coverage area, wherein the monitoring the downlink channel is based on the idle-mode measurements.

20. The apparatus of claim 19, the instructions executable by the processor to perform idle-mode measurements comprising instructions executable by the processor to:
perform the idle-mode measurements during a pre-wake-up time period before an eI-DRX-defined paging occasion (PO), wherein the pre-wake-up time period is a function of the eI-DRX cycle.

21. The apparatus of claim 16, further comprising instructions executable by the processor to:
establish the short paging configuration based at least in part on the change in the downlink channel reliability condition.

22. The apparatus of claim 15, wherein the short paging cycle is configured according to a system frame number (SFN) and the eI-DRX cycle is configured according to a hyper-SFN that extends the SFN.

23. The apparatus of claim 15, wherein the plurality of eI-DRX paging opportunities are configured to be within a subset of the plurality of the short paging cycles of the eI-DRX cycle according to the eI-DRX configuration.

24. A method for extended idle-mode discontinuous reception (eI-DRX) operation in a base station of a wireless communication system, comprising:
establishing a short paging configuration to be used by a user equipment (UE) served by the base station, the short paging configuration comprising at least one paging occasion of a short paging cycle;
establishing an eI-DRX configuration to be used by the UE, the eI-DRX configuration comprising an eI-DRX cycle and a plurality of eI-DRX paging opportunities, the eI-DRX cycle comprising a plurality of the short paging cycles;
adjusting when to transmit paging information to the UE based on the eI-DRX cycle and the short paging cycle, wherein the adjusting comprises adjusting transmission of the paging information according to the short paging cycle for the plurality of eI-DRX paging opportunities of each eI-DRX cycle; and
transmitting paging information to the UE.

25. The method of claim 24, the adjusting when to transmit paging information further comprising:
receiving a request from the UE to shorten the eI-DRX cycle; and
shortening the eI-DRX cycle in response to the received request.

26. The method of claim 24, further comprising:
establishing with the UE a pre-wake-up time period for the UE to perform idle-mode measurements before an eI-DRX-defined paging occasion (PO) for the UE, the idle-mode measurements including measuring a signal strength of one or more base stations.

27. The method of claim 26, further comprising:
broadcasting the pre-wake-up time period as part of a system information block (SIB).

28. The method of claim 24, the establishing the short paging configuration further comprising:
establishing a maximum number of monitoring instances for which the short paging cycle is to be used.

29. The method of claim 28, further comprising:
re-transmitting paging information based on the short paging cycle and the maximum number of monitoring instances.

30. The method of claim 24, further comprising:
establishing synchronization of system frame number (SFN) cycles between one or more base stations within a mobility management entity (MME) tracking area.

31. The method of claim 30, further comprising:
re-transmitting paging information simultaneously with the one or more base stations within the MME tracking area.

32. The method of claim 29, further comprising:
receiving a stop-page message from a mobility management entity (MME) indicating that the UE has performed a system access and that the base station may stop re-transmitting paging information to the UE.

33. The method of claim 24, wherein the short paging cycle is configured according to a system frame number (SFN) and the eI-DRX cycle is configured according to a hyper-SFN that extends the SFN.

34. The method of claim 24, wherein the plurality of eI-DRX paging opportunities are configured to be within a subset of the plurality of the short paging cycles of the eI-DRX cycle according to the eI-DRX configuration.

35. An apparatus for extended idle-mode discontinuous reception (eI-DRX) operation in a base station of a wireless communication system, comprising:
a processor;
memory in electronic communication with the processor; and
instructions stored in the memory and operable, when executed by the processor, to cause the apparatus to:
establish a short paging configuration to be used by a user equipment (UE) served by the base station, the short paging configuration comprising at least one paging occasion of a short paging cycle;
establish an eI-DRX configuration to be used by the UE, the eI-DRX configuration comprising an eI-DRX cycle and a plurality of eI-DRX paging opportunities, the eI-DRX cycle comprising a plurality of the short paging cycles;
adjust when to transmit paging information to the UE based on the eI-DRX cycle and the short paging cycle, wherein the adjusting comprises adjusting transmission of the paging information according to the short paging cycle for the plurality of eI-DRX paging opportunities of each eI-DRX cycle; and
transmit paging information to the UE.

36. The apparatus of claim 35, the instructions executable by the processor to adjust when to transmit paging information further comprising instructions executable by the processor to:
receive a request from the UE to shorten the eI-DRX cycle; and
shorten the eI-DRX cycle in response to the received request.

37. The apparatus of claim 35, wherein the short paging cycle is configured according to a system frame number (SFN) and the eI-DRX cycle is configured according to a hyper-SFN that extends the SFN.

38. The apparatus of claim 35, wherein the plurality of eI-DRX paging opportunities are configured to be within a subset of the plurality of the short paging cycles of the eI-DRX cycle according to the eI-DRX configuration.

* * * * *